(12) United States Patent
Chen et al.

(10) Patent No.: US 12,464,039 B2
(45) Date of Patent: Nov. 4, 2025

(54) CLOUD PLATFORM SELECTION METHOD, APPARATUS, AND DEVICE, AND MEDIUM

(71) Applicant: HUAWEI TECHNOLOGIES CO., LTD., Guangdong (CN)

(72) Inventors: Zhong Chen, Beijing (CN); Runfa Zhou, Shenzhen (CN); Li Zhang, Beijing (CN); Wenqiang Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/425,148

(22) Filed: Jan. 29, 2024

(65) Prior Publication Data

US 2024/0171631 A1   May 23, 2024

Related U.S. Application Data

(63) Continuation of application No. PCT/CN2022/108352, filed on Jul. 27, 2022.

(30) Foreign Application Priority Data

Jul. 30, 2021   (CN) .......................... 202110871929.1

(51) Int. Cl.
*H04L 67/51*   (2022.01)
*H04L 67/101*  (2022.01)

(52) U.S. Cl.
CPC ............ *H04L 67/101* (2013.01); *H04L 67/51* (2022.05)

(58) Field of Classification Search
CPC .............................. H04L 67/101; H04L 67/51
See application file for complete search history.

(56) References Cited

U.S. PATENT DOCUMENTS

| | | | |
|---|---|---|---|
| 2014/0047079 A1* | 2/2014 | Breternitz | G06F 9/5072 709/220 |
| 2015/0067171 A1* | 3/2015 | Yum | H04L 67/562 709/226 |

FOREIGN PATENT DOCUMENTS

| | | |
|---|---|---|
| CN | 103051614 A | 4/2013 |
| CN | 107040605 A | 8/2017 |
| CN | 110661704 A | 1/2020 |

OTHER PUBLICATIONS

Extended European Search Report issued in EP22848598.3, dated Oct. 1, 2024, 10 pages.

(Continued)

*Primary Examiner* — Suraj M Joshi

(57) ABSTRACT

A cloud platform selection method and a cloud platform selection apparatus are disclosed. The method includes: obtaining service information including access device information and path requirement information; obtaining a recommendation result of a cloud platform based on the service information, where the recommendation result indicates a cloud platform corresponding to each access device in a first device set, the first device set includes a first access device, the first access device corresponds to a first cloud platform, path requirement evaluation information of a path from the first access device to the first cloud platform meets the path requirement information, the first device set includes at least a part of one or more access devices, the cloud platform corresponding to each access device belongs to a candidate cloud platform set including one or more cloud platforms; and displaying the recommendation result in an interface.

18 Claims, 7 Drawing Sheets

(56) References Cited

OTHER PUBLICATIONS

Office Action issued in CN202110871929.1, dated Dec. 29, 2024, 7 pages.

* cited by examiner

CLOUD PLATFORM SELECTION METHOD, APPARATUS, AND DEVICE, AND MEDIUM

CROSS-REFERENCE TO RELATED APPLICATIONS

This application is a continuation of International Application No. PCT/CN2022/108352, filed on Jul. 27, 2022, which claims priority to Chinese Patent Application No. 202110871929.1, filed on Jul. 30, 2021. The disclosures of the aforementioned applications are hereby incorporated by reference in their entireties.

TECHNICAL FIELD

This application relates to the communication field, and in particular, to a cloud platform selection method, apparatus, and device, and a medium.

BACKGROUND

A cloud platform may provide services such as computing and/or storage, and a customer premises equipment (CPE) may access a cloud platform to use a service provided by the cloud platform.

Currently, when a CPE needs to access a cloud platform, a user may manually select a cloud platform for the CPE from a plurality of cloud platforms, for a terminal device to access. However, manually selecting a cloud platform by the user results in not only low cloud platform selection efficiency, but also high labor costs.

SUMMARY

This application provides a cloud platform selection method, apparatus, and device, and a medium. In this application, a recommendation result of a cloud platform is obtained based on service information. Because the recommendation result indicates a cloud platform corresponding to each access device in a first device set, and path requirement evaluation information of a path from the access device to the corresponding cloud platform meets path requirement information, so that the cloud platform that corresponds to the access device and that is indicated by the recommendation result may be directly selected for the access device respectively, to improve cloud platform selection efficiency, and reduce labor costs. The technical solutions are as follows:

According to a first aspect, this application provides a cloud platform selection method. The method includes: obtaining service information, where the service information includes access device information and path requirement information, the access device information includes device identifiers of M access devices, the path requirement information includes bandwidth information, and M is an integer greater than 0; obtaining a recommendation result of a cloud platform based on the service information, where the recommendation result indicates a cloud platform corresponding to each access device in a first device set, the first device set includes a first access device, the first access device corresponds to a first cloud platform, path requirement evaluation information of a path from the first access device to the first cloud platform meets the path requirement information, the first device set includes the M access devices or a part of the M access devices, the cloud platform corresponding to each access device belongs to a candidate cloud platform set, the candidate cloud platform set includes P cloud platforms, and P is an integer greater than 0; and displaying the recommendation result in a first interface.

Because the recommendation result of the cloud platform is obtained based on the service information, and the recommendation result indicates the cloud platform corresponding to each access device in the first device set, the cloud platform may be automatically recommended to each access device in the first device set, and the recommendation result is displayed in the first interface. For any access device in the first device set, namely, for the first access device, because the path requirement evaluation information of the path from the first access device to the first cloud platform meets the path requirement information, when the recommendation result is displayed in the first interface, the cloud platform that corresponds to the first access device and that is indicated by the recommendation result may be directly selected for the first access device, to enable the first access device to access the cloud platform that corresponds to the first access device and that is indicated by the recommendation result. In this way, platform selection efficiency is improved and labor costs are reduced.

In a possible implementation, a network topology is displayed in the first interface. Nodes in the network topology include the M access devices and the P cloud platforms. The network topology includes at least one latency circle corresponding to a root node. The root node is a node in the network topology, and the at least one latency circle is in a one-to-one correspondence with at least one latency threshold, and includes a first latency circle. A minimum latency from nodes located in the first latency circle to the root node is less than or equal to a first latency threshold, a minimum latency from nodes located outside the first latency circle to the root node is greater than the first latency threshold, and the first latency threshold is a latency threshold corresponding to the first latency circle. In this way, graphical display can be intuitively performed, and a user can intuitively detect a latency.

In another possible implementation, in the network topology, the path from the first access device to the first cloud platform is displayed in a specified display manner. This helps the user to identify the path from the network topology.

In another possible implementation, the specified display manner includes highlighting, displaying in bold, and/or displaying the path by using a color corresponding to the path.

In another possible implementation, N paths are calculated based on the service information, where N is greater than 0 and less than or equal to M. Each path corresponds to a different access device, the N paths include a first path, and path requirement evaluation information of the first path meets the path requirement information. The first path is a path from an access device in the first device set to a virtual node, where the virtual node is a parent node of the P cloud platforms. The cloud platform corresponding to each access device in the first device set is selected based on the N paths, to obtain the recommendation result.

A virtual node is created in the network topology, and the virtual node is a parent node of each cloud platform. In this way, the virtual node is used as a destination node of each access device, so that a corresponding path can be calculated for each access device in the first device set. In addition, the cloud platform is selected for the access device in the first device set based on the N paths. In this way, information required by each access device in the first device set is comprehensively considered based on the N paths, so that the cloud platform can be selected for more access devices, to ensure that as many access devices as possible can access the cloud platform. For example, a part of access devices in the M access devices may need a large quantity of bandwidth resources. Because bandwidth resources in the network are limited, when the cloud platform is selected based on the N paths, the cloud platform may be preferentially selected for an access device other than the part of access devices, to ensure that the cloud platform is selected for as many access devices as possible.

In another possible implementation, the first path corresponds to the first access device, and is calculated based on a device identifier of the first access device, the path requirement information, and the network topology. The nodes in the network topology include the virtual node, the M access devices, and the P cloud platforms. In this way, it is ensured that the path requirement evaluation information of the calculated first path meets the path requirement information.

In another possible implementation, the network topology further includes link information of a link between two adjacent nodes in the network topology, and the link information includes an available bandwidth of the link.

In another possible implementation, the link information further includes a latency and/or a route weight of the link, and the route weight indicates a route cost of the link.

In another possible implementation, the first path is a shortest path from the first access device to the virtual node.

In another possible implementation, an overloaded link set is obtained based on the path requirement information and the N paths. The overloaded link set includes at least one overloaded link and all or a part of links that the N paths pass through, and a load of the overloaded link exceeds an available bandwidth of the overloaded link. A first path set is obtained based on the overloaded link set. The first path set includes a part or all of the N paths, and a load of a link that a path in the first path set passes through does not exceed an available bandwidth of the link. A cloud platform that a second path passes through is selected as a cloud platform corresponding to a second access device. The second path is a path included in the first path set, and the second access device is an access device corresponding to the second path.

Because the first path set is obtained based on the overloaded link set, it is ensured that the load of the link that the path in the first path set passes through does not exceed the available bandwidth of the link. The cloud platform is selected for the access device in the first device set based on the first path set, and it is ensured that a resource occupied by each access device in the first device set does not exceed overall resources of the network, so that each access device can successfully access a corresponding cloud platform.

In another possible implementation, loads of a plurality of links are obtained based on the path requirement information and the N paths. The plurality of links include the links that the N paths pass through and a first link, a load of the first link is equal to a sum of path bandwidths required by access devices corresponding to at least one path, and the at least one path passes through the first link. In this way, the overloaded link set can be obtained based on the loads of the plurality of links.

In another possible implementation, a second path set is obtained based on the overloaded link set. Each path in the second path set passes through one or more overloaded links in the overloaded link set. A third path that meets a specified condition is selected from the second path set. A load of a target link is reduced based on a path bandwidth required by an access device corresponding to the third path, and the target link is an overloaded link that the third path passes through. A fourth path is migrated from the second path set to the first path set. A load of each overloaded link that the fourth path passes through does not exceed an available bandwidth of the overloaded link.

Because the load of the target link is reduced based on the path bandwidth required by the access device corresponding to the third path, an overloaded link that the fourth path in the second path set passes through becomes a non-overloaded link. The fourth path is migrated from the second path set to the first path set. In this way, when a cloud platform is selected for the access device in the first device set based on the first path set, it is ensured that a resource occupied by each access device in the first device set does not exceed overall resources of the network, so that each access device can successfully access a corresponding cloud platform.

In another possible implementation, the specified condition that the third path meets includes one or more of the following: an overload degree of the third path is the largest, a quantity of links included in the third path is the largest, and the path bandwidth required by the access device corresponding to the third path is the smallest. The overload degree of the third path indicates a quantity of overloaded links that the third path passes through.

In another possible implementation, the third path is migrated from the second path set to a third path set.

In another possible implementation, the first path set further includes a path that is in the N paths and that does not belong to the second path set.

In another possible implementation, an available bandwidth of a link that the second path passes through is reduced based on a path bandwidth required by the second access device. In this way, when a cloud platform is selected for X access devices corresponding to X paths in the third path set, it is ensured that resources occupied by the X access devices do not exceed the overall resources of the network, so that each access device can successfully access a corresponding cloud platform.

In another possible implementation, Y paths are calculated based on device identifiers of X access devices and the path requirement information. The X access devices include an access device corresponding to each path in the third path set, X is an integer greater than 0, and Y is greater than 0 and less than or equal to X. A corresponding cloud platform is selected, based on the Y paths, for an access device in a second device set. The second device set includes an access device corresponding to each of the Y paths. In this way, a cloud platform can be selected for more access devices.

According to a second aspect, this application provides an information display method. In the method, a first interface is displayed. The first interface is used to input service information. The service information includes access device information and path requirement information. The access device information includes device identifiers of M access devices, the path requirement information includes bandwidth information, and M is an integer greater than 0. Path information of an access device in a first device set is displayed in the first interface based on the service information. The path information includes device information of the access device, platform information of a cloud platform corresponding to the access device, and path requirement evaluation information of a path from the access device to the cloud platform. The path requirement evaluation information meets the path requirement information, and the first device set includes M terminal devices or a part of the M terminal devices.

Because the path information of the access device in the first device set is displayed in the first interface based on the service information, and the path information includes the device information of the access device, the platform information of the cloud platform corresponding to the access device, and the path requirement evaluation information of the path from the access device to the cloud platform, the cloud platform can be automatically recommended to each access device in the first device set. For any access device in the first device set, because path requirement evaluation information of a path from the access device to the cloud platform meets the path requirement information, the cloud platform that corresponds to the access device and that is displayed in the first interface may be directly selected for the access device, to enable the access device to access the cloud platform. In this way, platform selection efficiency is improved and labor costs are reduced.

According to a third aspect, this application provides a cloud platform selection apparatus. The apparatus includes a processing unit and a display unit. The processing unit is configured to obtain service information. The service information includes access device information and path requirement information, the access device information includes device identifiers of M access devices, the path requirement information includes bandwidth information, and M is an integer greater than 0. The processing unit is further configured to obtain a recommendation result of a cloud platform based on the service information. The recommendation result indicates a cloud platform corresponding to each access device in a first device set, the first device set includes a first access device, the first access device corresponds to a first cloud platform, path requirement evaluation information of a path from the first access device to the first cloud platform meets the path requirement information, the first device set includes the M access devices or a part of the M access devices, the cloud platform corresponding to each access device belongs to a candidate cloud platform set, the candidate cloud platform set includes P cloud platforms, and P is an integer greater than 0. A display unit is configured to display the recommendation result in a first interface.

Because the processing unit obtains the recommendation result of the cloud platform based on the service information, and the recommendation result indicates the cloud platform corresponding to each access device in the first device set, the processing unit may automatically recommend the cloud platform to each access device in the first device set, and the display unit displays the recommendation result in the first interface. For any access device in the first device set, namely, for the first access device, because the path requirement evaluation information of the path from the first access device to the first cloud platform meets the path requirement information, when the display unit displays the recommendation result in the first interface, the cloud platform that corresponds to the first access device and that is indicated by the recommendation result may be directly selected for the first access device, to enable the first access device to access the cloud platform that corresponds to the first access device and that is indicated by the recommendation result. In this way, platform selection efficiency is improved and labor costs are reduced.

In a possible implementation, the display unit is further configured to display a network topology in the first interface. Nodes in the network topology include the M access devices and the P cloud platforms. The network topology includes at least one latency circle corresponding to a root node. The root node is a node in the network topology, and the at least one latency circle is in a one-to-one correspondence with at least one latency threshold, and includes a first latency circle. A minimum latency from nodes located in the first latency circle to the root node is less than or equal to a first latency threshold, a minimum latency from nodes located outside the first latency circle to the root node is greater than the first latency threshold, and the first latency threshold is a latency threshold corresponding to the first latency circle. In this way, graphical display can be intuitively performed, and a user can intuitively detect a latency.

In another possible implementation, the display unit is further configured to display, in the network topology, the path from the first access device to the first cloud platform in a specified display manner.

In another possible implementation, the specified display manner includes highlighting, displaying in bold, and/or displaying the path by using a color corresponding to the path.

In another possible implementation, the processing unit is configured to: calculate N paths based on the service information, where N is greater than 0 and less than or equal to M, each path corresponds to a different access device, the N paths include a first path, path requirement evaluation information of the first path meets the path requirement information, the first path is a path from an access device in the first device set to a virtual node, and the virtual node is a parent node of the P cloud platforms; and select, based on the N paths, the cloud platform corresponding to each access device in the first device set, to obtain the recommendation result.

A virtual node is created in the network topology, and the virtual node is a parent node of each cloud platform. In this way, the virtual node is used as a destination node of each access device, so that a corresponding path can be calculated for each access device in the first device set. In addition, the cloud platform is selected for the access device in the first device set based on the N paths. In this way, information required by each access device in the first device set is comprehensively considered based on the N paths, so that the cloud platform can be selected for more access devices, to ensure that as many access devices as possible can access the cloud platform. For example, a part of access devices in the M access devices may need a large quantity of bandwidth resources. Because bandwidth resources in the network are limited, when the cloud platform is selected based on the N paths, the cloud platform may be preferentially selected for an access device other than the part of access devices, to ensure that the cloud platform is selected for as many access devices as possible.

In another possible implementation, the first path corresponds to the first access device, and the processing unit is configured to calculate the first path based on a device identifier of the first access device, the path requirement information, and the network topology of the network. The nodes in the network topology include the virtual node, the M access devices, and the P cloud platforms. In this way, it is ensured that the path requirement evaluation information of the calculated first path meets the path requirement information.

In another possible implementation, the network topology further includes link information of a link between two adjacent nodes in the network topology, and the link information includes an available bandwidth of the link.

In another possible implementation, the link information further includes a latency and/or a route weight of the link, and the route weight indicates a route cost of the link.

In another possible implementation, the first path is a shortest path from the first access device to the virtual node.

In another possible implementation, the processing unit is configured to: obtain an overloaded link set based on the path requirement information and the N paths, where the overloaded link set includes at least one overloaded link and all or a part of links that the N paths pass through, and a load of the overloaded link exceeds an available bandwidth of the overloaded link; obtain a first path set based on the overloaded link set, where the first path set includes a part or all of the N paths, and a load of a link that a path in the first path set passes through does not exceed an available bandwidth of the link; and select a cloud platform that a second path passes through as a cloud platform corresponding to a second access device, where the second path is a path included in the first path set, and the second access device is an access device corresponding to the second path.

Because the first path set is obtained based on the overloaded link set, it is ensured that the load of the link that the path in the first path set passes through does not exceed the available bandwidth of the link. The cloud platform is selected for the access device in the first device set based on the first path set, and it is ensured that a resource occupied by each access device in the first device set does not exceed overall resources of the network, so that each access device can successfully access a corresponding cloud platform.

In another possible implementation, the processing unit is configured to obtain loads of a plurality of links based on the path requirement information and the N paths. The plurality of links include the links that the N paths pass through and a first link, a load of the first link is equal to a sum of path bandwidths required by access devices corresponding to at least one path, and the at least one path passes through the first link. In this way, the overloaded link set can be obtained based on the loads of the plurality of links.

In another possible implementation, the processing unit is configured to: obtain a second path set based on the overloaded link set, where each path in the second path set passes through one or more overloaded links in the overloaded link set; select a third path that meets a specified condition from the second path set; reduce a load of a target link based on a path bandwidth required by an access device corresponding to the third path, where the target link is an overloaded link that the third path passes through; and migrate a fourth path from the second path set to the first path set, where a load of each overloaded link that the fourth path passes through does not exceed an available bandwidth of the overloaded link.

Because the load of the target link is reduced based on the path bandwidth required by the access device corresponding to the third path, an overloaded link that the fourth path in the second path set passes through becomes a non-overloaded link. The fourth path is migrated from the second path set to the first path set. In this way, when a cloud platform is selected for the access device in the first device set based on the first path set, it is ensured that a resource occupied by each access device in the first device set does not exceed overall resources of the network, so that each access device can successfully access a corresponding cloud platform.

In another possible implementation, the specified condition that the third path meets includes one or more of the following: an overload degree of the third path is the largest, a quantity of links included in the third path is the largest, and the path bandwidth required by the access device corresponding to the third path is the smallest. The overload degree of the third path indicates a quantity of overloaded links that the third path passes through.

In another possible implementation, the processing unit is further configured to migrate the third path from the second path set to a third path set.

In another possible implementation, the first path set further includes a path that is in the N paths and that does not belong to the second path set.

In another possible implementation, the processing unit is further configured to reduce, based on a path bandwidth required by the second access device, an available bandwidth of a link that the second path passes through. In this way, when a cloud platform is selected for X access devices corresponding to X paths in the third path set, it is ensured that resources occupied by the X access devices do not exceed the overall resources of the network, so that each access device can successfully access a corresponding cloud platform.

In another possible implementation, the processing unit is further configured to: calculate Y paths based on device identifiers of X access devices and the path requirement information, where the X access devices include an access device corresponding to each path in the third path set, X is an integer greater than 0, and Y is greater than 0 and less than or equal to X; and select, based on the Y paths, a corresponding cloud platform for an access device in a second device set, where the second device set includes an access device corresponding to each of the Y paths. In this way, a cloud platform can be selected for more access devices.

According to a fourth aspect, this application provides a cloud platform selection device. The device includes a processor and a computer program, and the processor is configured to execute the computer program in a memory, to enable the device to complete the method in any one of the first aspect, the second aspect, or any possible implementation of the first aspect.

According to a fifth aspect, this application provides a computer program product. The computer program product includes a computer program, and the computer program is loaded by a computer to implement the method in any one of the first aspect, the second aspect, or any possible implementation of the first aspect.

According to a sixth aspect, this application provides a computer-readable storage medium, configured to store a computer program. The computer program is loaded by a processor to perform the method in any one of the first aspect, the second aspect, or any possible implementation of the first aspect.

According to a seventh aspect, this application provides a chip, including a memory and a processor. The memory is configured to store computer instructions, and the processor is configured to invoke the computer instructions from the memory and run the computer instructions, to perform the method in any one of the first aspect, the second aspect, or any possible implementation of the first aspect.

According to an eighth aspect, this application provides a cloud platform selection system. The system includes an information obtaining module, a result obtaining module, and a display module. The information obtaining module is configured to obtain service information. The service information includes access device information and path requirement information, the access device information includes device identifiers of M access devices, the path requirement information includes bandwidth information, and M is an integer greater than 0. The result obtaining module is configured to obtain a recommendation result of a cloud platform based on the service information. The recommendation result indicates a cloud platform corresponding to each access device in a first device set, the first device set includes a first access device, the first access device corresponds to a first cloud platform, path requirement evaluation information of a path from the first access device to the first cloud platform meets the path requirement information, the first device set includes the M access devices or a part of the M access devices, the cloud platform corresponding to each access device belongs to a candidate cloud platform set, the candidate cloud platform set includes P cloud platforms, and P is an integer greater than 0. The display module is configured to display the recommendation result in a first interface.

Because the result obtaining module obtains the recommendation result of the cloud platform based on the service information, and the recommendation result indicates the cloud platform corresponding to each access device in the first device set, the cloud platform may be automatically recommended to each access device in the first device set, and the recommendation result is displayed in the first interface. For any access device in the first device set, namely, for the first access device, because the path requirement evaluation information of the path from the first access device to the first cloud platform meets the path requirement information, when the display module displays the recommendation result in the first interface, a user may directly select the cloud platform that corresponds to the first access device and that is indicated by the recommendation result for the first access device, to enable the first access device to access the cloud platform that corresponds to the first access device and that is indicated by the recommendation result. In this way, platform selection efficiency is improved and labor costs are reduced.

In a possible implementation, the display module is further configured to display a network topology in the first interface. Nodes in the network topology include the M access devices and the P cloud platforms. The network topology includes at least one latency circle corresponding to a root node. The root node is a node in the network topology, and the at least one latency circle is in a one-to-one correspondence with at least one latency threshold, and includes a first latency circle. A minimum latency from nodes located in the first latency circle to the root node is less than or equal to a first latency threshold, a minimum latency from nodes located outside the first latency circle to the root node is greater than the first latency threshold, and the first latency threshold is a latency threshold corresponding to the first latency circle.

In another possible implementation, the display module is further configured to display, in the network topology, the path from the first access device to the first cloud platform in a specified display manner. This helps the user to identify the path from the network topology.

In another possible implementation, the specified display manner includes highlighting, displaying in bold, and/or displaying the path by using a color corresponding to the path.

In another possible implementation, the result obtaining module is configured to: calculate N paths based on the service information, where N is greater than 0 and less than or equal to M, each path corresponds to a different access device, the N paths include a first path, path requirement evaluation information of the first path meets the path requirement information, the first path is a path from an access device in the first device set to a virtual node, and the virtual node is a parent node of the P cloud platforms; and select, based on the N paths, the cloud platform corresponding to each access device in the first device set, to obtain the recommendation result.

A virtual node is created in the network topology, and the virtual node is a parent node of each cloud platform. In this way, the virtual node is used as a destination node of each access device, so that a corresponding path can be calculated for each access device in the first device set. In addition, the cloud platform is selected for the access device in the first device set based on the N paths. In this way, information required by each access device in the first device set is comprehensively considered based on the N paths, so that the cloud platform can be selected for more access devices, to ensure that as many access devices as possible can access the cloud platform. For example, a part of access devices in the M access devices may need a large quantity of bandwidth resources. Because bandwidth resources in the network are limited, when the cloud platform is selected based on the N paths, the cloud platform may be preferentially selected for an access device other than the part of access devices, to ensure that the cloud platform is selected for as many access devices as possible.

In another possible implementation, the first path corresponds to the first access device, and the result obtaining module is configured to calculate the first path based on a device identifier of the first access device, the path requirement information, and the network topology of the network. The nodes in the network topology include the virtual node, the M access devices, and the P cloud platforms. In this way, it is ensured that the path requirement evaluation information of the calculated first path meets the path requirement information.

In another possible implementation, the network topology further includes link information of a link between two adjacent nodes in the network topology, and the link information includes an available bandwidth of the link.

In another possible implementation, the link information further includes a latency and/or a route weight of the link, and the route weight indicates a route cost of the link.

In another possible implementation, the first path is a shortest path from the first access device to the virtual node.

In another possible implementation, the result obtaining module is configured to: obtain an overloaded link set based on the path requirement information and the N paths, where the overloaded link set includes at least one overloaded link and all or a part of links that the N paths pass through, and a load of the overloaded link exceeds an available bandwidth of the overloaded link; obtain a first path set based on the overloaded link set, where the first path set includes a part or all of the N paths, and a load of a link that a path in the first path set passes through does not exceed an available bandwidth of the link; and select a cloud platform that a second path passes through as a cloud platform corresponding to a second access device, where the second path is a path included in the first path set, and the second access device is an access device corresponding to the second path. Because the first path set is obtained based on the overloaded link set, it is ensured that the load of the link that the path in the first path set passes through does not exceed the available bandwidth of the link. The cloud platform is selected for the access device in the first device set based on the first path set, and it is ensured that a resource occupied by each access device in the first device set does not exceed overall resources of the network, so that each access device can successfully access a corresponding cloud platform.

In another possible implementation, the result obtaining module is configured to: obtain loads of a plurality of links based on the path requirement information and the N paths, where the plurality of links include the links that the N paths pass through and a first link, a load of the first link is equal to a sum of path bandwidths required by access devices corresponding to at least one path, and the at least one path passes through the first link; and obtain the overloaded link set based on the loads of the plurality of links.

In another possible implementation, the result obtaining module is configured to: obtain a second path set based on the overloaded link set, where each path in the second path set passes through one or more overloaded links in the overloaded link set; select a third path that meets a specified condition from the second path set; reduce a load of a target link based on a path bandwidth required by an access device corresponding to the third path, where the target link is an overloaded link that the third path passes through; and migrate a fourth path from the second path set to the first path set, where a load of each overloaded link that the fourth path passes through does not exceed an available bandwidth of the overloaded link. Because the load of the target link is reduced based on the path bandwidth required by the access device corresponding to the third path, an overloaded link that the fourth path in the second path set passes through becomes a non-overloaded link. The fourth path is migrated from the second path set to the first path set. In this way, when a cloud platform is selected for the access device in the first device set based on the first path set, it is ensured that a resource occupied by each access device in the first device set does not exceed overall resources of the network, so that each access device can successfully access a corresponding cloud platform.

In another possible implementation, the specified condition that the third path meets includes one or more of the following: an overload degree of the third path is the largest, a quantity of links included in the third path is the largest, and the path bandwidth required by the access device corresponding to the third path is the smallest. The overload degree of the third path indicates a quantity of overloaded links that the third path passes through.

In another possible implementation, the system further includes: a path migration module, configured to migrate the third path from the second path set to a third path set.

In another possible implementation, the first path set further includes a path that is in the N paths and that does not belong to the second path set.

In another possible implementation, the system further includes: a bandwidth reduction module, configured to reduce, based on a path bandwidth required by the second access device, an available bandwidth of a link that the second path passes through. In this way, when a cloud platform is selected for X access devices corresponding to X paths in the third path set, it is ensured that resources occupied by the X access devices do not exceed the overall resources of the network, so that each access device can successfully access a corresponding cloud platform.

In another possible implementation, the result obtaining module is further configured to: calculate Y paths based on device identifiers of X access devices and the path requirement information, where the X access devices include an access device corresponding to each path in the third path set, X is an integer greater than 0, and Y is greater than 0 and less than or equal to X; and select, based on the Y paths, a corresponding cloud platform for an access device in a second device set, where the second device set includes an access device corresponding to each of the Y paths. In this way, a cloud platform can be selected for more access devices.

DESCRIPTION OF EMBODIMENTS

The following further describes implementations of this application in detail with reference to accompanying drawings.

Figure 1:
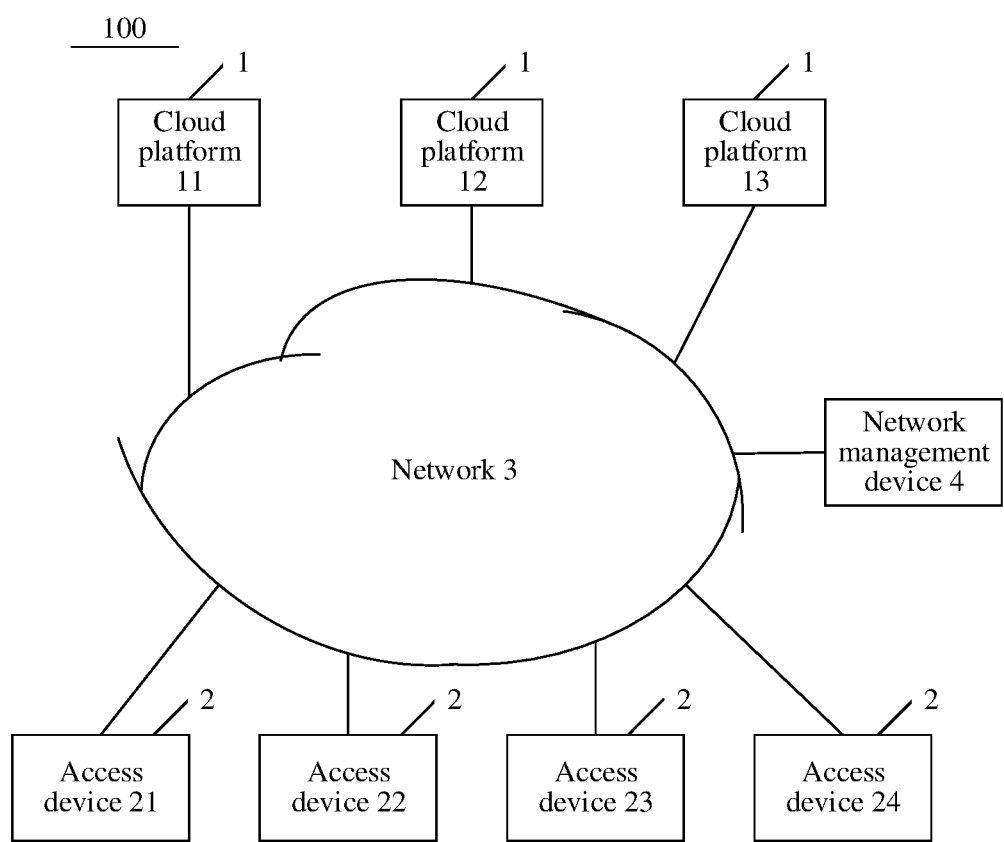
FIG. 1 is a schematic diagram of a structure of a network architecture according to an embodiment of this application.

FIG. 1 shows an example network architecture 100, including:

a plurality of cloud platforms 1 and a plurality of access devices 2. The access device 2 is used as a customer premises equipment CPE, a user may access one or more cloud platforms of the plurality of cloud platforms 1 by using the access device 2 to use a service provided by the cloud platform, and each cloud platform 1 and each access device 2 access a network 3.

For any access device 2, a path between the access device 2 and the cloud platform 1 may be established in the network 3. In this way, the access device 2 accesses the cloud platform 1 by using the path.

For example, as shown in FIG. 1, the plurality of access devices 2 include access devices 21, 22, 23, and 24, and the plurality of cloud platforms include cloud platforms 11, 12, and 13. The access devices 21, 22, 23, and 24, and the cloud platforms 11, 12, and 13 all access the network 3.

The access device 21 is used as an example. A path between the access device 21 and a cloud platform is established in the network 3. Assuming that the cloud platform is the cloud platform 11, the access device 21 accesses the cloud platform 11 by using the path. The access device 22 is further used as an example. A path between the access device 22 and a cloud platform is established in the network 3. Assuming that the cloud platform is the cloud platform 12, the access device 22 accesses the cloud platform 12 by using the path. Other access devices are not listed one by one.

Figure 2:
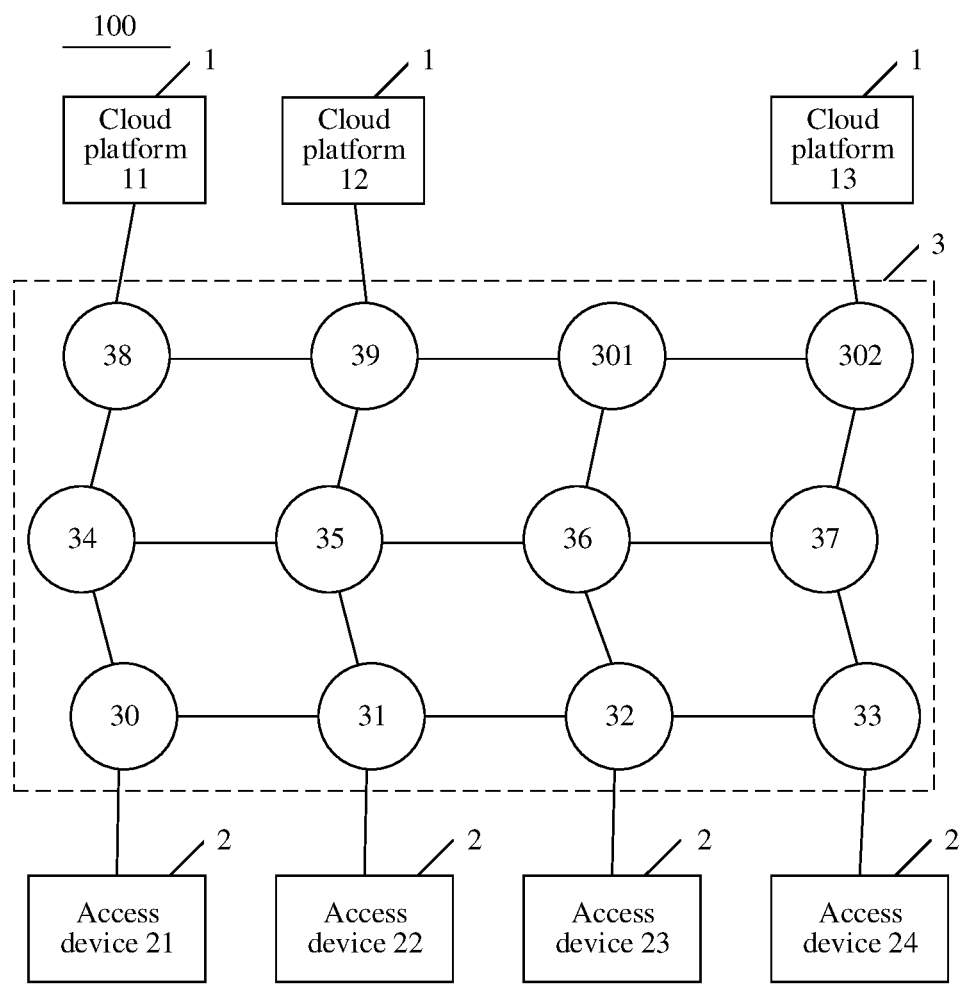
FIG. 2 is a schematic diagram of a structure of another network architecture according to an embodiment of this application.

As shown in FIG. 2, a network 3 includes a plurality of forwarding nodes, and a path between an access device 2 and a cloud platform 1 usually passes through one or more forwarding nodes in the network 3.

For example, as shown in FIG. 2, a path between an access device 21 and a cloud platform 11 is used as an example. The path passes through forwarding nodes 30, 34, and 38. For another example, refer to FIG. 2. A path between an access device 22 and a cloud platform 12 is used as an example. The path passes through forwarding nodes 31, 35, and 39.

In some embodiments, the plurality of forwarding nodes include one or more of the following: a router, a switch, a base station, and the like.

As shown in FIG. 1, the network architecture 100 further includes a network management device 4, and the network management device 4 is connected to the network 3.

In some embodiments, the network management device 4 communicates with the plurality of cloud platforms 1 by using the network 3, and/or communicates with the plurality of access devices 2 by using the network 3.

In some embodiments, the network management device 4 is configured to manage the plurality of cloud platforms 1, the plurality of access devices 2, and/or the forwarding nodes in the network 3.

Figure 3:
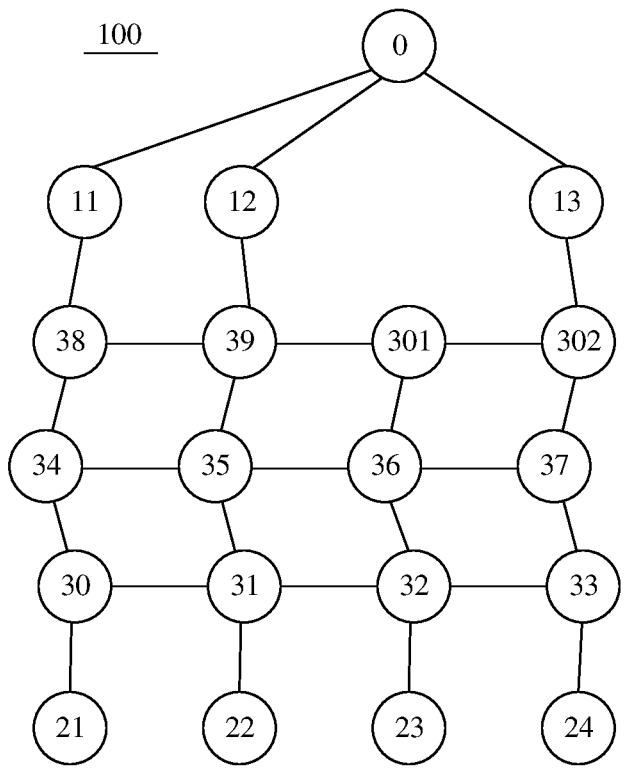
FIG. 3 is a schematic diagram of a structure of a network topology according to an embodiment of this application.

For the network architecture 100, the network management device 4 further includes a network topology of the network architecture 100. As shown in FIG. 3, nodes in the network topology include the plurality of cloud platforms 1 and the plurality of access devices 2. For example, nodes 11, 12, and 13 in FIG. 3 are respectively cloud platforms 11, 12, and 13. Nodes 21, 22, 23, and 24 in FIG. 3 are respectively access devices 21, 22, 23, and 24.

The nodes in the network topology further include the forwarding nodes in the network 3. For example, nodes 30, 31, 32, 33, 34, 35, 36, 37, 38, 39, 301, and 302 in FIG. 3 are respectively forwarding nodes 30, 31, 32, 33, 34, 35, 36, 37, 38, 39, 301, and 302 in the network 3.

As shown in FIG. 3, a network management device 4 further sets up a virtual node 0 in the network topology, and the virtual node 0 is a parent node of each cloud platform 1.

For a link between any two adjacent nodes in the network topology, the network topology further includes link information of the link, and the link information includes at least an available bandwidth of the link.

In some embodiments, the link information of the link further includes information such as a latency and/or a route weight of the link. The route weight indicates a route cost of the link.

In some embodiments, the route weight is determined based on a link bandwidth of the link. For the link, a larger link bandwidth indicates a smaller route weight and a lower route cost, and a smaller link bandwidth indicates a larger route weight and a higher route cost.

A larger link bandwidth of a link may indicate a smaller latency required for transmitting data by using the link, so that the route cost of the link is lower. On the contrary, a smaller link bandwidth of a link may indicate a larger latency required for transmitting data by using the link, so that the route cost of the link is higher.

The available bandwidth of the link is less than or equal to the link bandwidth of the link.

In some embodiments, the access device 2 is a CPE whose device type is a switch, a router, a firewall, a gateway device, or the like. The network management device 4 is configured to perform device management and policy control on the access device 2, may be a controller, a network management system, or a network management platform, and may be specifically deployed on a server or a terminal device, or on a public cloud platform. Alternatively, the network management device 4 is a device cluster including a plurality of devices, and the device is a server or a terminal device.

In some embodiments, if the network management device 4 is a server or a terminal device, the network management device 4 includes one or more processors. If the network management device 4 is a device cluster including a plurality of devices, each device includes one or more processors. Therefore, the network management device 4 includes a plurality of processors. In conclusion, in the foregoing two cases, the network management device 4 includes one or more processors.

In some embodiments, if the network management device 4 includes a plurality of processors, the plurality of processors include one main processor and at least one subordinate processor, and the main processor is configured to manage the at least one subordinate processor.

Figure 4:
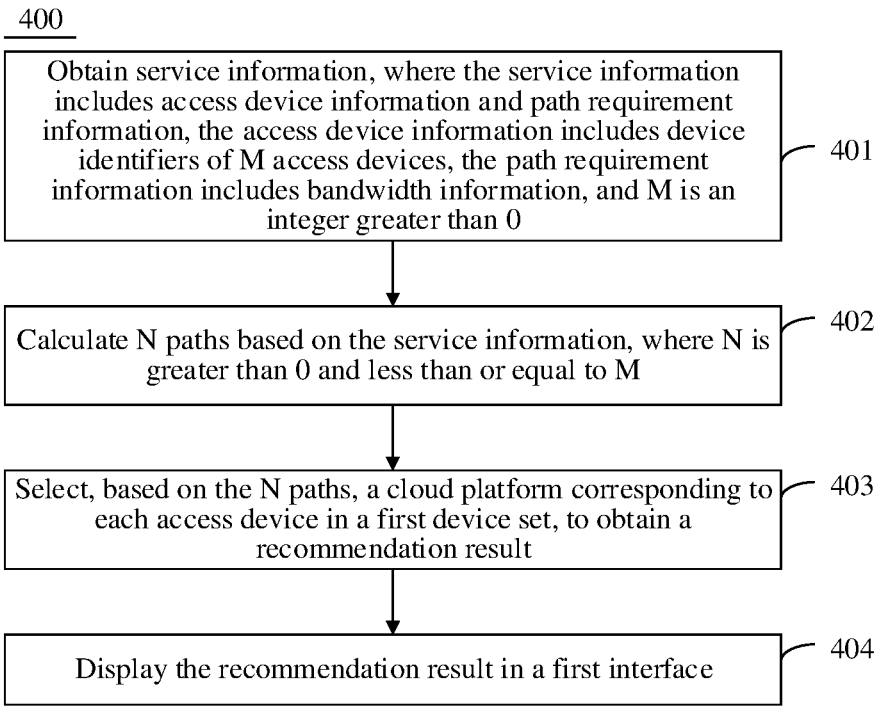
FIG. 4 is flowchart of a cloud platform selection method according to an embodiment of this application.

As shown in FIG. 4, an embodiment of this application provides a cloud platform selection method 400. The method 400 is applied to the network architecture 100 shown in FIG. 1 or FIG. 2. The method 400 may be performed by a network management device of the network architecture 100, and includes the following steps.

Step 401: Obtain service information, where the service information includes access device information and path requirement information, the access device information includes device identifiers of M access devices, the path requirement information includes bandwidth information, and M is an integer greater than 0.

In some embodiments, the service information is information that requires to be input by a user into a network service subscription platform based on a service requirement of the user, or information that is input by a network service provider into a service management system based on a service purchase agreement signed with the user. For example, the user purchases a network service to use a terminal device in a user network, for example, a personal computer or a server, and may access, by using a CPE A in the user network, a cloud service in a cloud platform B provided by a cloud service provider, for example, an enterprise employee management service. In addition, a data transmission path from the CPE A of the user to the cloud platform B requires to meet a specific path requirement. For example, a bandwidth requires to meet 100 Mbps, and a path latency requires to be less than 100 ms. In some embodiments, the path requirement information further includes latency information and the like.

The path requirement information includes requirement information of each of the M access devices. For requirement information of any access device, the requirement information includes a path bandwidth required by the access device; or the requirement information includes a path bandwidth, a latency, and the like required by the access device.

For the bandwidth information and/or the latency information included in the path requirement information, the bandwidth information includes a path bandwidth required by each access device, and the latency information includes a latency required by each access device.

The path bandwidth required by each access device is the same, and the bandwidth information includes one path bandwidth; or the path bandwidth required by each access device is different, and the bandwidth information includes the path bandwidth required by each access device. The latency required by each access device is the same, and the latency information includes one latency; or the latency required by each access device is different, and the latency information includes the latency required by each access device.

In some embodiments, the network management device displays a first interface. In this way, the user inputs the access device information and the path requirement information in the first interface, and then the network management device obtains the access device information and the path requirement information from the first interface.

The first interface includes at least one first input element and at least one second input element. The user inputs the access device information into the at least one first input element, and inputs the path requirement information into the at least one second input element. The first interface further includes a button. When receiving a command triggered by clicking the button by the user, the network management device obtains the access device information from the at least one first input element, and obtains the path requirement information from the at least one second input element.

The user inputs information into an input element of the first interface in one or more of the following manners: The user may input information into an input element of the first interface by using a keyboard, the user may paste information copied and/or cut by the user into an input element of the first interface, and the user inputs information into an input element of the first interface in a voice manner.

Both the first input element and the second input element are input boxes, and the first interface includes M first input boxes and at least one second input box. The M first input boxes are used to input device identifiers of M access devices, and the at least one second input box is used to input the path requirement information.

Figure 5:
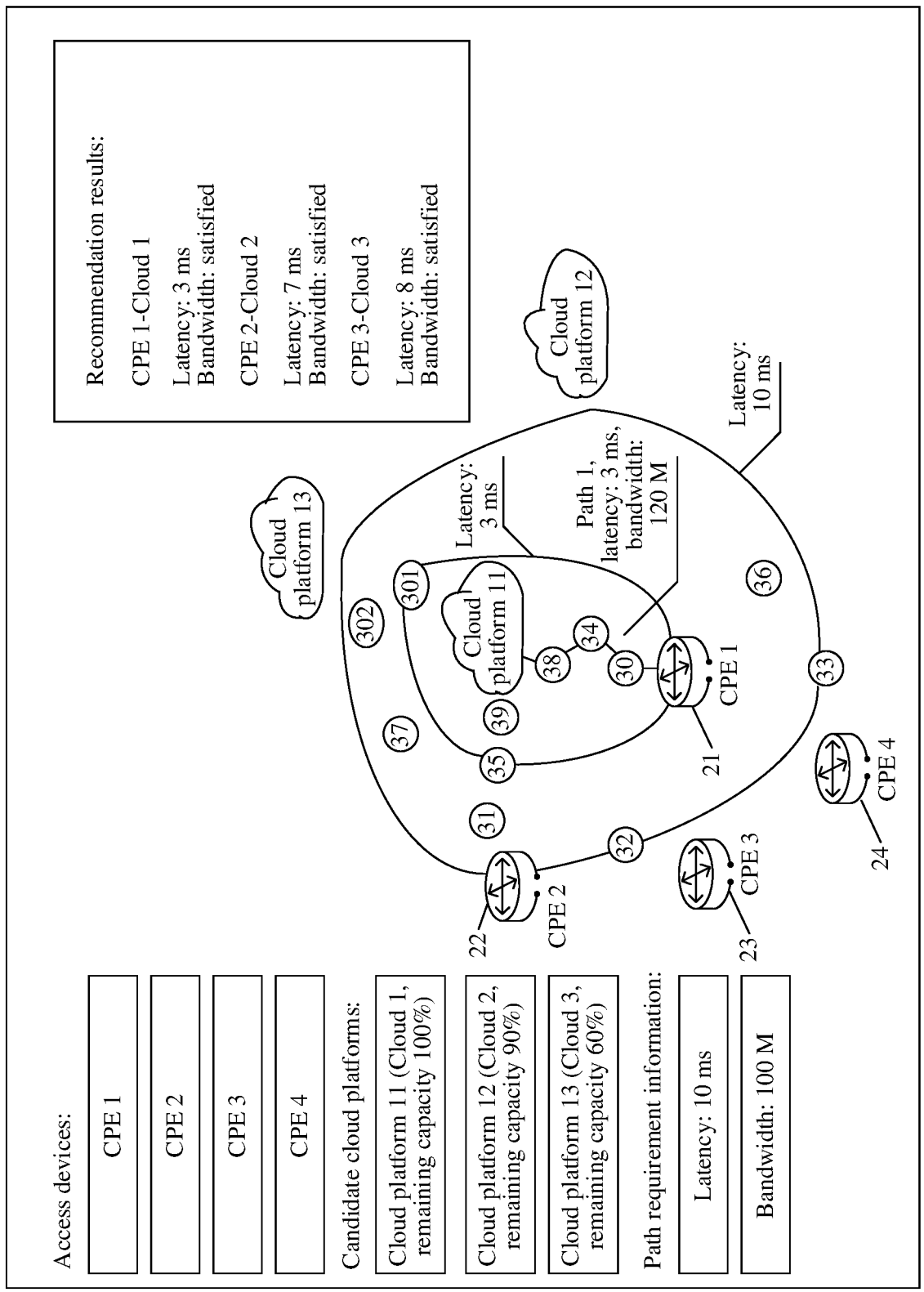
FIG. 5 is a schematic diagram of a first interface according to an embodiment of this application.

For example, a first interface shown in FIG. 5 includes four first input boxes and two second input boxes. A user inputs device identifiers of four access devices into the four first input boxes, and the device identifiers are respectively CPE 1, CPE 2, CPE 3, and CPE 4. Alternatively, device information of an access device of the user is built in the first input box, for example, access device identifiers CPE 1 and CPE 2. The user may click or select the device information of the access device as an input of the first input box, input latency information (10 ms) into one of the second input boxes, and input bandwidth information (100 M) into the other second input box. CPE 1, CPE 2, CPE 3, and CPE 4 are respectively a device identifier of the access device 21, a device identifier of the access device 22, a device identifier of the access device 23, and a device identifier of the access device 24 in the network architecture 100 shown in FIG. 2. The first interface shown in FIG. 5 further includes a "recommendation button". When receiving a command triggered by clicking the "recommendation button" by the user, the network management device obtains the device identifiers of the four access devices from the four first input boxes, and obtains the path requirement information from the two second input elements.

The device identifier of the access device includes one or more pieces of the following information: an address of the access device, a name of the access device, a serial number of the access device, and the like.

In some embodiments, the network management device further obtains platform information of P cloud platforms, where P is an integer greater than 0. The P cloud platforms are candidate cloud platforms. The network management device may select, from a candidate cloud platform set, a cloud platform for the M access devices. The candidate cloud platform set includes the P candidate cloud platforms.

In some embodiments, the first interface further includes at least one third input element, and the user inputs the platform information of the P cloud platforms into the at least one third input element. When receiving a command triggered by clicking the button by the user, the network management device obtains the platform information of the P cloud platforms from the at least one third input element.

The third input element is an input box. For example, refer to the first interface shown in FIG. 5. The first interface includes three third input boxes. The user inputs platform information of three cloud platforms into the three third input boxes, for example, a name of the cloud platform: a cloud platform 11. Alternatively, platform information of a candidate cloud platform that can be selected, for example, an icon of the cloud platform is built in the third input box, and the user may click or select the icon of the cloud platform or the platform information of the cloud platform as an input of the third input box. When receiving a command triggered by clicking the "recommendation button" by the user, the network management device obtains the platform information of the three cloud platforms from the three third input boxes. The platform information of the three cloud platforms respectively includes platform identifiers of the three cloud platforms, and the platform identifiers of the three cloud platforms are Cloud 1, Cloud 2, and Cloud 3. Cloud 1, Cloud 2, and Cloud 3 are respectively a device identifier of the cloud platform 11, a device identifier of the cloud platform 12, and a device identifier of the cloud platform 13 in the network architecture 100 shown in FIG. 2.

The platform information of the cloud platform includes information such as a platform identifier, a remaining capacity, and/or a cost of the cloud platform.

Step 402: Calculate N paths based on the service information, where N is greater than 0 and less than or equal to M.

The service information includes the access device information and the path requirement information. In other words, in step 402, the N paths are calculated based on the access device information and the path requirement information.

Each of the N paths corresponds to a different access device. Because N is less than or equal to M, N access devices corresponding to the N paths are the M access devices or a part of the M access devices.

The N paths include a first path, and path requirement evaluation information of the first path meets the path requirement information. The first path is a path from an access device in a first device set to a virtual node, and the first device set includes the M access devices or a part of the M access devices.

For ease of description, an access device corresponding to the first path is referred to as a first access device. In other words, the first path is a path from the first access device to the virtual node, and the first path passes through a cloud platform. In some embodiments, the cloud platform that the first path passes through is one of the P candidate cloud platforms, or the cloud platform that the first path passes through is one cloud platform in a network.

The path requirement evaluation information of the first path includes a bandwidth of the first path, and may further include information such as a latency of the first path.

For example, when the path requirement evaluation information of the first path includes the bandwidth of the first path, and the path requirement information includes a path bandwidth required by the first access device, and when the bandwidth of the first path is greater than or equal to the path bandwidth required by the first access device, it indicates that the path requirement evaluation information of the first path meets the path requirement information. For another example, when the path requirement evaluation information of the first path includes the bandwidth and the latency of the first path, and the path requirement information includes a path bandwidth and a latency that are required by the first access device, and when the bandwidth of the first path is greater than or equal to the path bandwidth required by the first access device and the latency of the first path is less than or equal to the latency required by the first access device, it indicates that the path requirement evaluation information of the first path meets the path requirement information.

The network management device includes a network topology of the network. For the first path, the first path is calculated based on the device identifier of the first access device, the path requirement information, and the network topology.

In some embodiments, whether a path whose path requirement evaluation information meets requirement information of the first access device exists is calculated based on the device identifier of the first access device, the requirement information of the first access device, and the network topology. If the path exists, the path is used as the first path corresponding to the first access device. If the path does not exist, path calculation for the first access device is stopped.

In some embodiments, the first path is a shortest path from the first access device to the virtual node.

In some embodiments, the shortest path means that in paths from the first access device to the virtual node, a sum of route weights corresponding to the first path is the smallest. The sum of the route weights of the first path is equal to an accumulated value of route weights of all links that the first path passes through.

For the other M−1 access devices, a path corresponding to each of the other access devices is calculated in the same way that is used for the first access device.

For example, for the device identifier CPE 1 of the access device 21, a path 1 from the access device 21 to the cloud platform 11 is calculated based on the device identifier CPE 1 of the access device 21, requirement information of the access device 21, and the network topology shown in FIG. 3. Links that the path 1 passes through include a link <21, 30> between the access device 21 and the forwarding node 30, a link <30, 34> between the forwarding node 30 and the forwarding node 34, a link <34, 38> between the forwarding node 34 and the forwarding node 38, and a link <38, 11> between the forwarding node 38 and the cloud platform 11.

For the device identifier CPE 2 of the access device 22, a path 2 from the access device 22 to the cloud platform 12 is calculated based on the device identifier CPE 2 of the access device 22, requirement information of the access device 22, and the network topology shown in FIG. 3. Links that the path 2 passes through include a link <22, 31> between the access device 22 and the forwarding node 31, a link <31, 35> between the forwarding node 31 and the forwarding node 35, a link <35, 39> between the forwarding node 35 and the forwarding node 39, and a link <39, 12> between the forwarding node 39 and the cloud platform 12.

For the device identifier CPE 3 of the access device 23, a path 3 from the access device 23 to the cloud platform 12 is calculated based on the device identifier CPE 3 of the access device 23, requirement information of the access device 23, and the network topology shown in FIG. 3. Links that the path 3 passes through include a link <23, 32> between the access device 23 and the forwarding node 32, a link <32, 36> between the forwarding node 32 and the forwarding node 36, a link <36, 35> between the forwarding node 36 and the forwarding node 35, the link <35, 39> between the forwarding node 35 and the forwarding node 39, and the link <39, 12> between the forwarding node 39 and the cloud platform 12.

For the device identifier CPE 4 of the access device 24, a path 4 from the access device 24 to the cloud platform 13 is calculated based on the device identifier CPE 4 of the access device 24, requirement information of the access device 24, and the network topology shown in FIG. 3. Links that the path 4 passes through include a link <24, 33> between the access device 24 and the forwarding node 33, a link <33, 37> between the forwarding node 33 and the forwarding node 37, a link <37, 302> between the forwarding node 37 and the forwarding node 302, and a link <302, 13> between the forwarding node 302 and the cloud platform 13.

In some embodiments, the network management device includes a plurality of processors. Assuming that the network management device includes Q processors and Q is an integer greater than 1, one processor is a main processor, and the other Q−1 processors are subordinate processors.

The main processor of the network management device groups the M access devices into Q device sets, and the Q device sets are in a one-to-one correspondence with the Q processors. For any processor and a device set corresponding to the processor, the processor is configured to calculate a path for an access device in the device set. The main processor obtains each path calculated by the subordinate processor, to obtain N paths in total. In this way, the Q processors perform parallel path calculation, which improves efficiency of the path calculation.

It should be noted that when calculating a path, each processor does not update link information of each link in the network topology. To be specific, information such as an available bandwidth, a latency, and/or a route weight of each link is not updated.

Step 403: Select, based on the N paths, a cloud platform corresponding to each access device in the first device set, to obtain a recommendation result.

The first device set includes the M access devices or a part of the M access devices. The recommendation result indicates the cloud platform corresponding to each access device in the first device set.

In some embodiments, the recommendation result includes path information of each access device in the first device set. For path information of any access device in the first device set, the path information includes device information of the access device, platform information of a cloud platform corresponding to the access device, and path requirement evaluation information of a path from the access device to the cloud platform.

Figure 6:
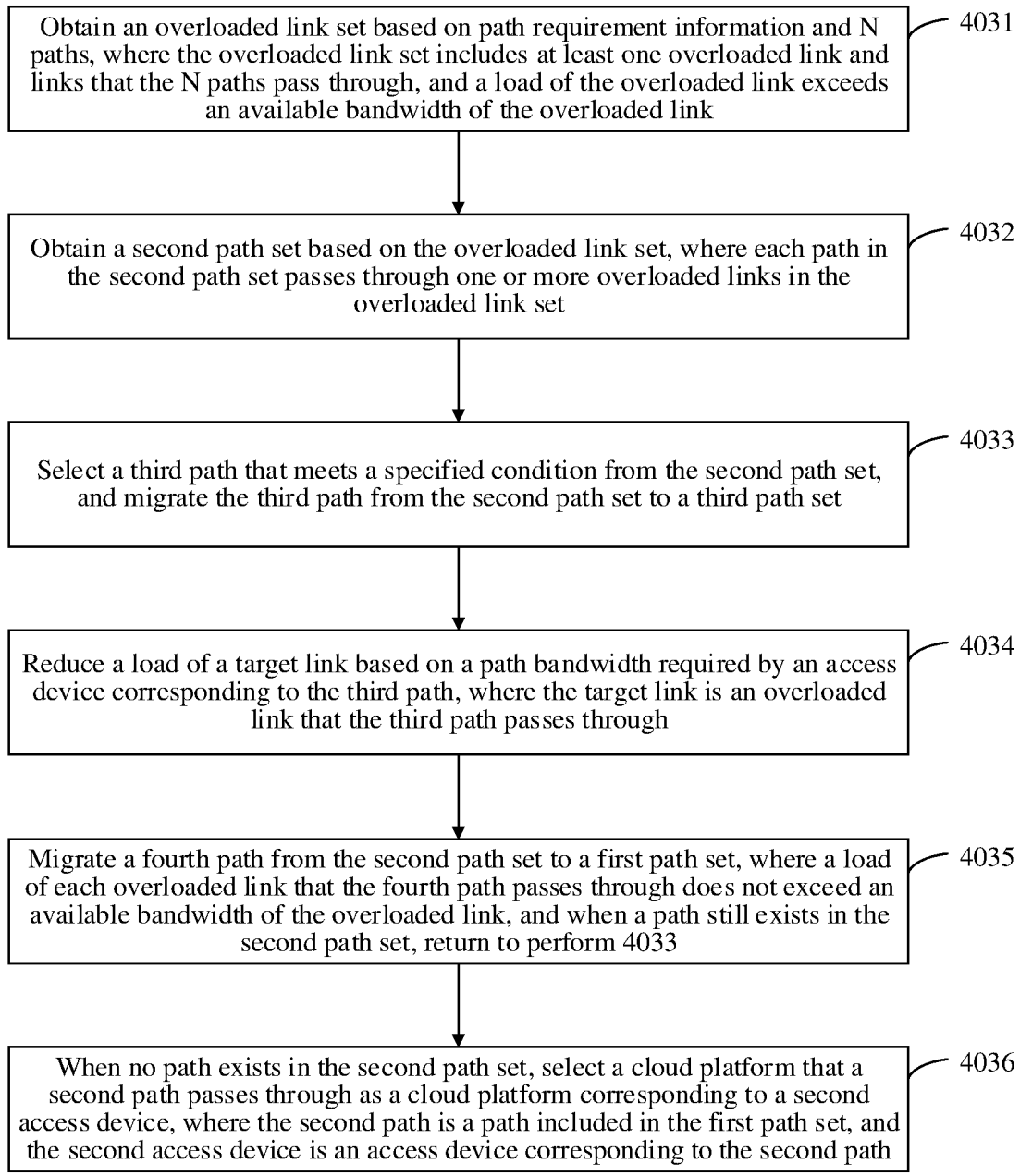
FIG. 6 is a flowchart of selecting a cloud platform corresponding to each access device in a first device set according to an embodiment of this application.

In step 403, as shown in FIG. 6, the cloud platform corresponding to each access device in the first device set may be selected by performing the following operations/steps 4031 to 4036. The operations/steps 4031 to 4036 are as follows:

4031: Obtain an overloaded link set based on the path requirement information and the N paths, where the overloaded link set includes at least one overloaded link and all or a part of links that the N paths pass through, and a load of the overloaded link exceeds an available bandwidth of the overloaded link.

In 4031, the overloaded link set is obtained by performing the following operations (1) and (2). The operations (1) and (2) are as follows:

(1): Obtain loads of a plurality of links based on the path requirement information and the N paths. The plurality of links include the links that the N paths pass through and a first link, a load of the first link is equal to a sum of path bandwidths required by access devices corresponding to at least one path, and the at least one path passes through the first link.

In the operation (1), for each of the N paths, a link that each path passes through is determined, to obtain the plurality of links. In other words, the plurality of links include the links that the N paths pass through. For any one of the plurality of links, for ease of description, the link is referred to as the first link, and at least one path that passes through the first link is determined. For each of the at least one path, a path bandwidth required by an access device corresponding to the path is obtained from the path requirement information, and the obtained path bandwidths are accumulated to obtain the load of the first link. A load of each of the plurality of links is obtained in the same manner of obtaining the load of the first link.

For example, the N paths include the obtained path 1, path 2, path 3, and path 4, and the path requirement information includes that path bandwidths required by the access device 21, the access device 22, the access device 23, and the access device 24 are all "100 M". It is determined that the links that the path 1 passes through include the link <21, 30>, the link <30, 34>, the link <34, 38>, and the link <38, 11>, the links that the path 2 passes through include the link <22, 31>, the link <31, 35>, the link <35, 39>, and the link <39, 12>, the links that the path 3 passes through include the link <23, 32>, the link <32, 36>, the link <36, 35>, the link <35, 39>, and the link <39, 12>, and the links that the path 4 passes through include the link <24, 33>, the link <33, 37>, the link <37, 302>, and the link <302, 13>.

For the link <21, 30>, a path that passes through the link <21, 30> includes the path 1. Therefore, a load of the link <21, 30> is equal to a path bandwidth "100 M" required by the access device 21 corresponding to the path 1. For the link <35, 39>, paths that pass through the link <35, 39> include the path 2 and the path 3. Therefore, a load of the link <35, 39> is equal to a sum of a path bandwidth "100" required by the access device 22 corresponding to the path 2 and a path bandwidth "100 M" required by the access device 23 corresponding to the path 3, that is, the load of the link <35, 39> is equal to "200 M".

For other links, loads of the other links are obtained in the same manner. For example, loads of the link <30, 34>, the link <34, 38>, the link <38, 11>, the link <22, 31>, the link <31, 35>, the link <23, 32>, the link <32, 36>, the link <36, 35>, the link <24, 33>, the link <33, 37>, the link <37, 302>, and the link <302, 13> are all 100 M, and a load of the link <39, 12> is 200 M.

(2): Obtain the overloaded link set based on the loads of the plurality of links.

In the operation (2), an available bandwidth of each link is obtained from the network topology of the network, and a link whose load exceeds an available bandwidth of the link is selected from the plurality of links as the overloaded link based on the available bandwidth and the load of each link, to obtain the overloaded link set.

For example, assuming that the load "200 M" of the link <35, 39> exceeds an available bandwidth "150 M" of the link <35, 39>, the link <35, 39> is an overloaded link; assuming that the load "200 M" of the link <39, 12> exceeds an available bandwidth "160 M" of the link <39, 12>, the link <39, 12> is an overloaded link. Therefore, the overloaded link set includes the overloaded link <35, 39> and the overloaded link <39, 12>.

Next, a first path set is obtained based on the overloaded link set. The first path set includes a part or all of the N paths, and a load of a link that a path in the first path set passes through does not exceed an available bandwidth of the link. During implementation, the first path set may be obtained by performing the following steps 4032 to 4036.

4032: Obtain a second path set based on the overloaded link set, where each path in the second path set passes through one or more overloaded links in the overloaded link set.

In 4032, an overloaded link is selected from the overloaded link set, one or more paths that pass through the overloaded link are selected from the N paths, and the one or more paths are added to the second path set. The foregoing operations are repeated to add all paths that are in the N paths and that include overloaded links to the second path set.

For other paths that are in the N paths and that do not belong to the second path set, a link that each of the other paths passes through is not an overloaded link. Therefore, each of the other paths is added to the first path set.

For example, the overloaded link set includes the overloaded link <35, 39> and the overloaded link <39, 12>, and the path 2 and the path 3 pass through the two overloaded links. Therefore, the second path set includes the path 2 and the path 3, and the first path set includes the path 1 and the path 4 other than the path 2 and the path 3.

4033: Select a third path that meets a specified condition from the second path set, and migrate the third path from the second path set to a third path set.

The specified condition that the third path meets includes one or more of the following: an overload degree of the third path is the largest, a quantity of links included by the third path is the largest, and a path bandwidth required by an access device corresponding to the third path is the smallest. The overload degree of the third path indicates a quantity of overloaded links that the third path passes through.

The following lists an implementation instance of selecting the third path. Certainly, there is another implementation instance of selecting the third path. The implementation instance is as follows:

For any path in the second path set, statistics on a quantity of overloaded links that the path passes through is collected, an overload degree of the path is obtained based on the quantity of overloaded links, and an overload degree of each path in the second path set is obtained in the same manner. A path with a largest overload degree is selected from the second path set, and if only one path is selected, the selected path is used as the third path.

If a plurality of paths are selected, statistics on a quantity of links of each path in the plurality of paths is collected, and a path with a largest quantity of links is selected from the plurality of paths. If there is only one path with the largest quantity of links, the path with the largest quantity of links is used as the third path.

If there are a plurality of paths with the largest quantity of links, a path bandwidth required by an access device corresponding to each link in the plurality of links is obtained from the path requirement information, an access device that requires a minimum path bandwidth is selected, and a path corresponding to the selected access device is used as the third path.

In some embodiments, for the foregoing operations of obtaining the overload degree of the path, the quantity of overloaded links is used as the overload degree of the path, or a product of the quantity of overloaded links and a specified coefficient is used as the overload degree of the path.

For example, for the path 2 and the path 3 in the second path set, both the path 2 and the path 3 include two overloaded links. Therefore, overload degrees of both the path 2 and the path 3 are 2, and paths that have the largest overload degrees and that are selected from the second path set include the path 2 and the path 3. The path 2 includes four links, and the path 3 includes five links. The path 3 with the largest quantity of links is selected from the path 2 and the path 3 as the third path. The path 3 is migrated from the second path set to the third path set, and a remaining path in the second path set includes the path 2.

4034: Reduce a load of a target link based on a path bandwidth required by the access device corresponding to the third path, where the target link is an overloaded link that the third path passes through.

In 4034, each overloaded link that the third path passes through is determined, to obtain the target link. The path bandwidth required by the access device corresponding to the third path is subtracted from the load of the target link. If a reduced load of the target link is less than or equal to an available bandwidth of the target link, the target link is changed from the overloaded link to a non-overloaded link, and is removed from the overloaded link set. If a reduced load of the target link is greater than the available bandwidth of the target link, the target link is still retained in the overloaded link set.

When the target link is changed to a non-overloaded link, a path that passes through the target link is obtained from the second path set, and an overload degree of the path is reduced based on a quantity of target links. A reduced overload degree of the path may be 0, and a load of each overloaded link that the path passes through does not exceed an available bandwidth of the overloaded link. Therefore, a load of each link that the path passes through does not exceed an available bandwidth of the link. Alternatively, a reduced overload degree of the path may still be greater than 0. In other words, the path further passes through an overloaded link whose load exceeds an available bandwidth of the overloaded link.

For example, the third path is the path 3, overloaded links that the path 3 passes through are the link <35, 39> and the link <39, 12>, and a path bandwidth required by the access device 23 corresponding to the path 3 is "100 M". Based on the path bandwidth "100 M", a load of the link <35, 39> and a load of the link <39, 12> are reduced, and a reduced load of the link <35, 39> and a reduced load of the link <39, 12> are both "100 M". The reduced load of the link <35, 39> and the load of the reduced link <39, 12> are both less than available bandwidths of the two links. Both the link <35, 39> and the link <39, 12> are changed to non-overloaded links.

4035: Migrate a fourth path from the second path set to the first path set, where a load of each overloaded link that the fourth path passes through does not exceed an available bandwidth of the overloaded link, and when a path still exists in the second path set, return to perform step 4033.

The fourth path is a path whose overload degree is changed to 0 in the second path set.

For example, the second path set includes the path 2, and therefore, the load of the link <35, 39> that the path 2 passes through and the load of the link <39, 12> that the path 2 passes through do not exceed the available bandwidths of the two links. Therefore, the path 2 is migrated from the second path set to the first path set, and the first path set includes the path 1, the path 2, and the path 4.

4036: When no path exists in the second path set, select a cloud platform that a second path passes through as a cloud platform corresponding to a second access device, where the second path is a path included in the first path set, and the second access device is an access device corresponding to the second path.

Each access device included in the first device set is an access device corresponding to each path in the first path set. In this way, a corresponding cloud platform is selected for each access device in the first device set based on the first path set.

For example, the first device set includes the access device 21 corresponding to the path 1 in the first path set, the access device 22 corresponding to the path 2 in the first path set, and the access device 24 corresponding to the path 4 in the first path set. The cloud platform 11 that the path 1 passes through is selected as the cloud platform corresponding to the access device 21, the cloud platform 12 that the path 2 passes through is selected as the cloud platform corresponding to the access device 22, and the cloud platform 13 that the path 4 passes through is selected as the cloud platform corresponding to the access device 24.

In 4036, the recommendation result includes path information of each path in the first path set. For any path in the first path set, path information of the path includes device information of an access device corresponding to the path, platform information of a cloud platform that the path passes through, and path requirement evaluation information of the path.

In 4036, after the corresponding cloud platform is selected for the second access device, an available bandwidth of a link that the second path passes through is further reduced based on a path bandwidth required by the second access device. In other words, for the link that the second path passes through, an available bandwidth that is of the link and that is stored in the network topology is reduced based on the path bandwidth required by the second access device.

It should be noted that the third path set further includes a path, X is used to represent a quantity of paths included in the third path set, and X is an integer greater than 0. For X access devices corresponding to the X paths, the following step 501 and step 502 further need to be performed to select a cloud platform for the X access devices.

Step 501: Calculate Y paths based on device identifiers of the X access devices and the path requirement information, where Y is greater than 0 and less than or equal to X.

For a detailed implementation process of calculating the Y paths in step 501, refer to related content of calculating the N paths in step 402.

Step 502: Select, based on the Y paths, a corresponding cloud platform for an access device in a second device set. The second device set includes an access device corresponding to each of the Y paths.

In step 502, the process of steps 4031 to 4036 shown in FIG. 6 may be used to select the corresponding cloud platform for the access device in the second device set. During implementation, the N paths in step 4031 are replaced with the Y paths, and then the process of steps 4031 to 4036 is performed.

After the process of steps 4031 to 4036 is performed, the third path set may be obtained, or the third path set may not be obtained. If the third path set cannot be obtained, the operation is stopped. If the third path set is obtained, the third path set includes Z paths, and Z is an integer greater than 0. It is assumed that W is used to represent a quantity of paths included in the third path set that is obtained last time. When W-Z exceeds a specified threshold, for Z access devices corresponding to the Z paths, the foregoing steps 501 and 502 further need to be repeated to select a cloud platform for the Z access devices. When W-Z does not exceed the specified threshold, the operation is stopped. An initial value of W is equal to X.

In some embodiments, the specified threshold is equal to a product of M and a specified proportion. For example, assuming that the specified proportion is 0.05, the specified threshold is equal to 0.05*M, and * is a multiplication operation.

Step 404: Display the recommendation result in a first interface.

In some embodiments, the recommendation result may be presented in the first interface by using a text description. To be specific, device information of each access device in the first device set, device information of the cloud platform corresponding to each access device in the first device set, and path requirement evaluation information of a path corresponding to each access device in the first device set are displayed in the first interface.

For example, refer to the first interface shown in FIG. 5. Device information (CPE 1) of the access device 21, device information (Cloud 1) of the cloud platform 11 corresponding to the access device 21, and path requirement evaluation information (including a latency of 7 ms) of the path 1 corresponding to the access device 21 are displayed in the first interface. Device information (CPE 2) of the access device 22, device information (Cloud 2) of the cloud platform 12 corresponding to the access device 22, and path requirement evaluation information (including a latency of 7 ms) of the path 2 corresponding to the access device 22 are displayed in the first interface. Device information (CPE 4) of the access device 24, device information (Cloud 3) of the cloud platform 13 corresponding to the access device 24, and path requirement evaluation information (including a latency of 8 ms) of the path 4 corresponding to the access device 24 are displayed in the first interface. In the first interface, bandwidths displayed in the path requirement evaluation information of the path 1, the path requirement evaluation information of the path 2, and the path requirement evaluation information of the path 4 are "satisfied", indicating that the bandwidth of the path 1 meets the path bandwidth required by the access device 21 corresponding to the path 1, the bandwidth of the path 2 meets the path bandwidth required by the access device 22 corresponding to the path 2, and the bandwidth of the path 4 meets the path bandwidth required by the access device 24 corresponding to the path 4.

In some embodiments, the recommendation result may be presented in the first interface with reference to a visualized graph. In other words, a network topology is further displayed in the first interface. The network topology includes at least one latency circle corresponding to a root node. The root node is a node in the network topology, and the at least one latency circle is in a one-to-one correspondence with at least one latency threshold, and includes a first latency circle. A minimum latency from nodes located in the first latency circle to the root node is less than or equal to a first latency threshold, a minimum latency from nodes located outside the first latency circle to the root node is greater than the first latency threshold, and the first latency threshold is a latency threshold corresponding to the first latency circle.

The root node is a node selected by the user from the network topology displayed in the first interface. The user may click a node in the network topology, or the user inputs a device identifier of a node in the network topology into the first interface.

In some embodiments, operations of drawing the first latency circle in the network topology are as follows: When a click operation for the node is detected, the node is obtained as the root node, or a device identifier of the node is received, and a node corresponding to the device identifier is used as the root node. An $i^{th}$-layer node connected to the root node is traversed based on the root node, where i=1, 2, 3 . . . . For any $i^{th}$-layer node, if a minimum latency from the $i^{th}$-layer node to the root node is less than or equal to the first latency threshold, and a minimum latency from an $(i+1)^{th}$-layer node connected to the $i^{th}$-layer node to the root node is greater than the first latency threshold, the $i^{th}$-layer node is used as a boundary node of the first latency circle. In the foregoing manner, each boundary node of the first latency circle is obtained, and the first latency circle connected to each boundary node is drawn in the network topology.

For example, the first interface shown in FIG. 5 is an instance of a presentation manner of the recommendation result. Certainly, there are other instances for presenting the recommendation result, which are not listed one by one herein. The network topology is displayed in the first interface, and the user selects the cloud platform 11. Correspondingly, the cloud platform 11 is obtained as the root node, and a latency circle corresponding to a latency threshold "3 ms" and a latency circle corresponding to a latency threshold "10 ms" are drawn in the network topology.

From the first interface shown in FIG. 5, the user can intuitively see which access devices are located in the latency circle corresponding to the cloud platform 11. For example, for the access device 21 corresponding to the device identifier "CPE 1", it can be intuitively learned from the first interface that the access device 21 is located in the latency circle corresponding to the latency threshold "3 ms" of the cloud platform 11, and the user can intuitively learn from the first interface that a path latency from CPE 1 to the cloud platform 11 is less than 10 ms. The path latency meets a user experience requirement on a path. For the access device 22 corresponding to the device identifier "CPE 2", it can be intuitively learned from the first interface that the access device 22 is located in the latency circle corresponding to the latency threshold "10 ms" of the cloud platform 11, and the user can intuitively learn from the first interface that a path latency from CPE 2 to the cloud platform 11 is equal to 10 ms. The path latency meets the user experience requirement that a path latency is less than or equal to 10 ms. For the access device 23 corresponding to the device identifier "CPE 3" and the device 24 corresponding to the device identifier "CPE 4", it can be intuitively learned from the first interface that the access device 23 and the access device 24 are located outside the latency circle corresponding to the latency threshold "10 ms" of the cloud platform 11, and the user can intuitively learn from the first interface that both a path latency from CPE 3 to the cloud platform 11 and a path latency from CPE 4 to the cloud platform 11 exceed 10 ms. The path latencies do not meet the user experience requirement that a path latency is less than or equal to 10 ms.

In some embodiments, for an access device that corresponds to the root node (cloud platform) and that is indicated by the recommendation result, a path from the access device to the root node is further displayed in the first interface. For example, the root node in FIG. 5 is the cloud platform 11, the recommendation result indicates the access device 21 (CPE 1) corresponding to the cloud platform 11, and the path 1 from the access device 21 (CPE 1) to the cloud platform 11 is displayed in the first interface.

In some embodiments, path requirement evaluation information of the path from the access device to the root node is further displayed in the first interface, and the displayed path requirement evaluation information includes information such as a latency and/or a bandwidth of the path. For example, with respect to the path 1 shown in FIG. 5, the path requirement evaluation information of the path 1 is displayed in the first interface shown in FIG. 5. The path requirement evaluation information includes a latency "3 ms" and/or a bandwidth "120 M" of the path 1, and the like.

Figure 7:
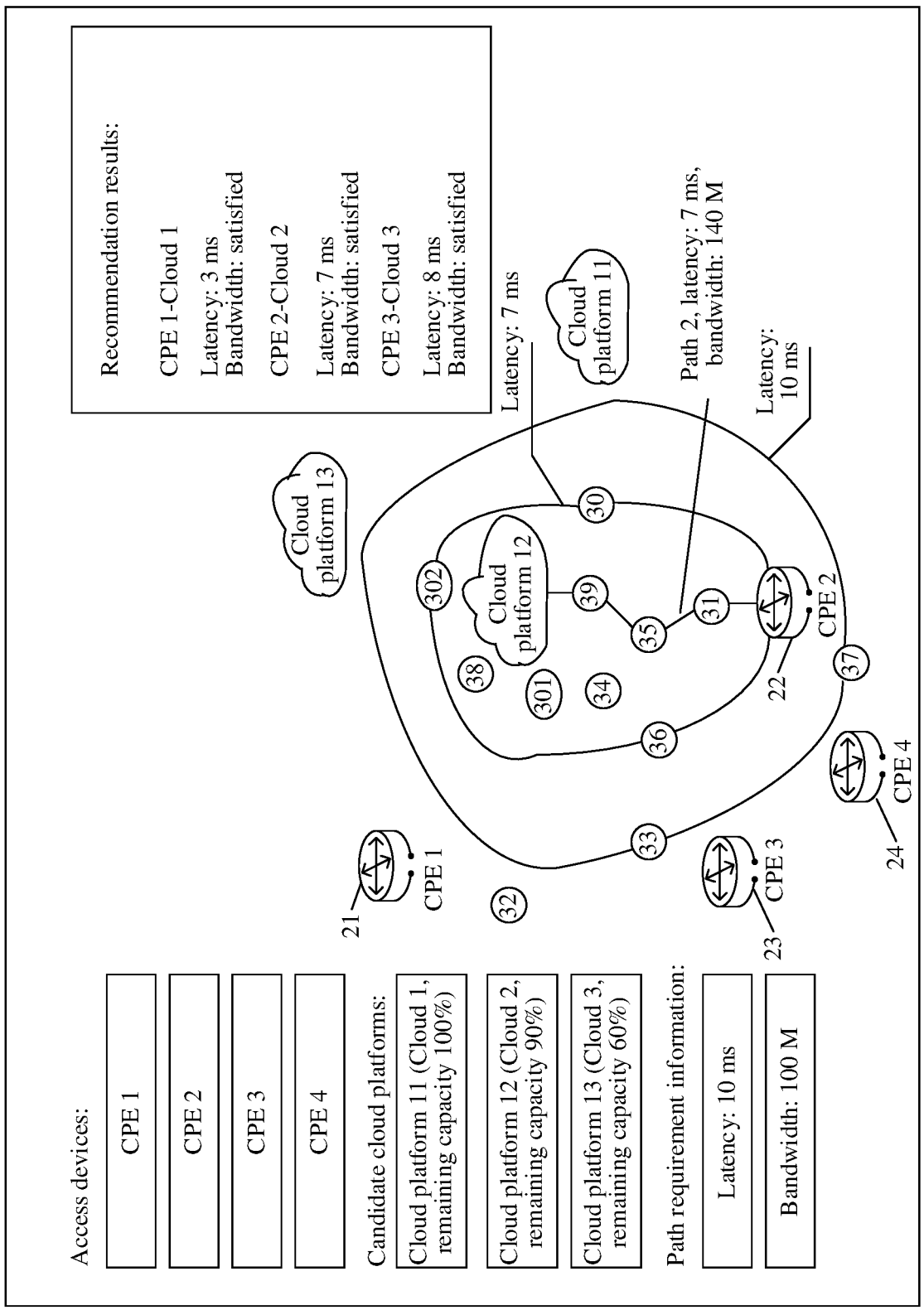
FIG. 7 is a schematic diagram of another first interface according to an embodiment of this application.

In addition to selecting the cloud platform 11 as the root node to display, on the first interface, the latency circle corresponding to the cloud platform 11, the user may further select another node as the root node to display, on the first interface, a latency circle corresponding to the another node. For another example, as shown in FIG. 7, it is assumed that the user selects the cloud platform 12. Correspondingly, the cloud platform 12 is obtained as the root node, and latency thresholds corresponding to the cloud platform 12 include 7 ms and 10 ms. In the network topology included in the first interface shown in FIG. 7, a latency circle corresponding to the latency threshold "7 ms" and a latency circle corresponding to the latency threshold "10 ms" are drawn.

From the first interface shown in FIG. 7, the user can intuitively see which access devices are located in the latency circle corresponding to the cloud platform 12. For example, for the access device 22 corresponding to the device identifier "CPE 2", it can be intuitively learned from the first interface that the access device 22 is located in the latency circle corresponding to the latency threshold "7 ms" of the cloud platform 12, and the user can intuitively learn from the first interface that a path latency from CPE 2 to the cloud platform 12 is less than 10 ms. The path latency meets the user experience requirement on a path. For the access device 21 corresponding to the device identifier "CPE 1", the access device 23 corresponding to the device identifier "CPE 3", and the access device 24 corresponding to the device identifier "CPE 4", it can be intuitively learned from the first interface that the access device 21, the access device 23, and the access device 24 are located outside the latency circle corresponding to the latency threshold "10 ms" of the cloud platform 12, and the user can intuitively learn from the first interface that a path latency from CPE 1 to the cloud platform 12, a path latency from CPE 3 to the cloud platform 12, and a path latency from CPE 4 to the cloud platform 12 all exceed 10 ms. The path latencies do not meet the user experience requirement that a path latency is less than or equal to 10 ms.

With respect to the root node (cloud platform 12) in FIG. 7, the recommendation result indicates the access device 22 (CPE 2) corresponding to the cloud platform 12, and the path 2 from the access device 22 (CPE 2) to the cloud platform 12 is displayed in the first interface. In addition, the path requirement evaluation information of the path 2 is displayed in the first interface shown in FIG. 7. The path requirement evaluation information includes a latency "7 ms" and/or a bandwidth "140 M" of the path 2, and the like.

In some embodiments, in the network topology, a path from the first access device to the first cloud platform is displayed in a specified display manner. The first access device is an access device in the first device set, and the first cloud platform is a cloud platform corresponding to the first access device.

The specified display manner includes highlighting, displaying in bold, and/or displaying a path by using a color corresponding to the path, and the like. All paths in the first path set may correspond to a same color or different colors.

It should be noted that, because the recommendation result displayed in the first interface includes the path requirement evaluation information of the path corresponding to the access device in the first device set, the user may learn, by using the path requirement evaluation information of the path corresponding to the access device, whether a path whose path requirement evaluation information meets the requirement information of the access device exists between the access device and the cloud platform. If the path exists, the network management device sends path information of the path and platform information of the cloud platform to the access device, to enable the access device to access the cloud platform through the path based on the path information of the path and the platform information of the cloud platform.

In embodiments of this application, service information is obtained. The service information includes device identifiers of M access devices and path requirement information. N paths are calculated based on the device identifiers of the M access devices and the path requirement information. Each path corresponds to a different access device. Each of the N paths meets the path requirement information, and passes through one cloud platform. A corresponding cloud platform is selected for a terminal device in the first device set based on the N paths, to obtain a recommendation result. The recommendation result indicates a cloud platform corresponding to each access device in the first device set, and the first device set includes the M access devices and a part of the M access devices. The recommendation result is displayed in the first interface. Because the corresponding cloud platform is selected for the terminal device in the first device set based on the N paths, and the recommendation result is obtained, a corresponding cloud platform can be automatically selected for an access device, to improve cloud platform selection efficiency and reduce labor costs. Because the recommendation result is displayed, a user can learn whether the cloud platform corresponding to the access device meets the requirement information of the access device.

Figure 8:
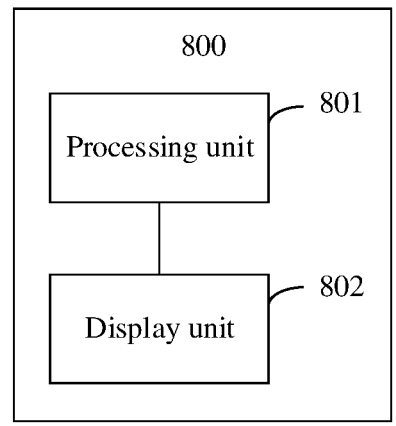
FIG. 8 is a schematic diagram of a structure of a cloud platform selection apparatus according to an embodiment of this application.

As shown in FIG. 8, an embodiment of this application provides a cloud platform selection apparatus 800. The apparatus 800 is deployed on the network management device in the network architecture 100 shown in FIG. 1 or the network management device in the method 400 shown in FIG. 4. The apparatus 800 includes:

a processing unit 801, configured to obtain service information, where the service information includes access device information and path requirement information, the access device information includes device identifiers of M access devices, the path requirement information includes bandwidth information, and M is an integer greater than 0, where the processing unit 801 is further configured to obtain a recommendation result of a cloud platform based on the service information, where the recommendation result indicates a cloud platform corresponding to each access device in a first device set, the first device set includes a first access device, the first access device corresponds to a first cloud platform, path requirement evaluation information of a path from the first access device to the first cloud platform meets the path requirement information, the first device set includes the M access devices or a part of the M access devices, the cloud platform corresponding to each access device belongs to a candidate cloud platform set, the candidate cloud platform set includes P cloud platforms, and P is an integer greater than 0; and a display unit 802, configured to display the recommendation result in a first interface.

Optionally, for a detailed implementation process in which the processing unit 801 obtains the service information, refer to related content in step 401 in the method 400 shown in FIG. 4.

Optionally, for a detailed implementation process in which the processing unit 801 obtains the recommendation result of the cloud platform, refer to related content in steps 402 to 403 in the method 400 shown in FIG. 4.

Optionally, for a detailed implementation process in which the display unit 802 displays the recommendation result in the first interface, refer to related content in step 404 in the method 400 shown in FIG. 4.

Optionally, the display unit 802 is further configured to:
display a network topology in the first interface, where nodes in the network topology include the M access devices and the P cloud platforms, the network topology includes at least one latency circle corresponding to a root node, the root node is a node in the network topology, the at least one latency circle is in a one-to-one correspondence with at least one latency threshold, and includes a first latency circle, a minimum latency from nodes located in the first latency circle to the root node is less than or equal to a first latency threshold, a minimum latency from nodes located outside the first latency circle to the root node is greater than the first latency threshold, and the first latency threshold is a latency threshold corresponding to the first latency circle.

Optionally, for a detailed implementation process in which the display unit 802 displays the network topology, refer to related content in step 404 in the method 400 shown in FIG. 4.

Optionally, the display unit 802 is further configured to:
display, in the network topology, the path from the first access device to the first cloud platform in a specified display manner.

Optionally, the specified display manner includes highlighting, displaying in bold, and/or displaying the path by using a color corresponding to the path.

Optionally, the processing unit 801 is configured to:
calculate N paths based on the service information, where N is greater than 0 and less than or equal to M, each path corresponds to a different access device, the N paths include a first path, path requirement evaluation information of the first path meets the path requirement information, the first path is a path from an access device in the first device set to a virtual node, and the virtual node is a parent node of the P cloud platforms; and
select, based on the N paths, the cloud platform corresponding to each access device in the first device set, to obtain the recommendation result.

Optionally, for a detailed implementation process in which the processing unit 801 calculates the N paths, refer to related content in step 402 in the method 400 shown in FIG. 4.

Optionally, for a detailed implementation process in which the processing unit 801 selects the cloud platform corresponding to each access device in the first device set, refer to related content in step 403 in the method 400 shown in FIG. 4.

Optionally, the first path corresponds to the first access device, and the processing unit 801 is configured to:
calculate the first path based on a device identifier of the first access device, the path requirement information, and the network topology of the network, where the nodes in the network topology include the virtual node, the M access devices, and the P cloud platforms.

Optionally, for a detailed implementation process in which the processing unit 801 calculates the first path, refer to related content in step 402 in the method 400 shown in FIG. 4.

Optionally, the network topology further includes link information of a link between two adjacent nodes in the network topology, and the link information includes an available bandwidth of the link.

Optionally, the link information further includes a latency and/or a route weight of the link, and the route weight indicates a route cost of the link.

Optionally, the first path is a shortest path from the first access device to the virtual node.

Optionally, the processing unit 801 is configured to:
obtain an overloaded link set is obtained based on the path requirement information and the N paths, where the overloaded link set includes at least one overloaded link and all or a part of links that the N paths pass through, and a load of the overloaded link exceeds an available bandwidth of the overloaded link;
obtain a first path set based on the overloaded link set, where the first path set includes a part or all of the N paths, and a load of a link that a path in the first path set passes through does not exceed an available bandwidth of the link; and
select a cloud platform that a second path passes through as a cloud platform corresponding to a second access device, where the second path is a path included in the first path set, and the second access device is an access device corresponding to the second path.

Optionally, for a detailed implementation process in which the processing unit 801 obtains the overloaded link set, refer to related content in step 4031 in the method 400 shown in FIG. 4.

Optionally, for a detailed implementation process in which the processing unit 801 obtains the first path set, refer to related content in steps 4032 to 4035 in the method 400 shown in FIG. 4.

Optionally, the processing unit 801 is configured to:
obtain loads of a plurality of links based on the path requirement information and the N paths, where the plurality of links include the links that the N paths pass through and a first link, a load of the first link is equal to a sum of path bandwidths required by access devices corresponding to at least one path, and the at least one path passes through the first link; and
obtain the overloaded link set based on the loads of the plurality of links.

Optionally, for a detailed implementation process in which the processing unit 801 obtains the loads of the plurality of links, refer to content of the operation (1) in step 4031 in the method 400 shown in FIG. 4.

Optionally, for a detailed implementation process in which the processing unit 801 obtains the overloaded link set based on the loads of the plurality of links, refer to content of the operation (2) in step 4031 in the method 400 shown in FIG. 4.

Optionally, the processing unit 801 is configured to:
obtain a second path set based on the overloaded link set, where each path in the second path set passes through one or more overloaded links in the overloaded link set;
select a third path that meets a specified condition from the second path set;
reduce a load of a target link based on a path bandwidth required by an access device corresponding to the third path, where the target link is an overloaded link that the third path passes through; and migrate a fourth path from the second path set to the first path set, where a load of each overloaded link that the fourth path passes through does not exceed an available bandwidth of the overloaded link.

Optionally, for a detailed implementation process in which the processing unit 801 obtains the second path set, refer to related content in step 4032 in the method 400 shown in FIG. 4.

Optionally, for a detailed implementation process in which the processing unit 801 selects the third path, refer to related content in step 4033 in the method 400 shown in FIG. 4.

Optionally, for a detailed implementation process in which the processing unit 801 reduces the load of the target link, refer to related content in step 4034 in the method 400 shown in FIG. 4.

Optionally, the specified condition that the third path meets includes one or more of the following:

an overload degree of the third path is the largest, a quantity of links included by the third path is the largest, and the path bandwidth required by the access device corresponding to the third path is the smallest, where the overload degree of the third path indicates a quantity of overloaded links that the third path passes through.

Optionally, the processing unit 801 is further configured to:

migrate the third path from the second path set to a third path set.

Optionally, the first path set further includes a path that is in the N paths and that does not belong to the second path set.

Optionally, the processing unit 801 is further configured to:

reduce, based on a path bandwidth required by the second access device, an available bandwidth of a link that the second path passes through.

Optionally, for a detailed implementation process in which the processing unit 801 reduces the available bandwidth of the link that the second path passes through, refer to related content in step 4036 in the method 400 shown in FIG. 4.

Optionally, the processing unit 801 is further configured to:

calculate Y paths based on device identifiers of X access devices and the path requirement information, where the X access devices include an access device corresponding to each path in the third path set, X is an integer greater than 0, and Y is greater than 0 and less than or equal to X; and select, based on the Y paths, a corresponding cloud platform for an access device in a second device set, where the second device set includes an access device corresponding to each of the Y paths.

Optionally, for a detailed implementation process in which the processing unit 801 calculates the Y paths, refer to related content in step 501 in the method 400 shown in FIG. 4.

Optionally, for a detailed implementation process in which the processing unit 801 selects the corresponding cloud platform for the access device in the second device set, refer to related content in step 502 in the method 400 shown in FIG. 4.

In embodiments of this application, because the processing unit obtains the recommendation result of the cloud platform based on the service information, and the recommendation result indicates the cloud platform corresponding to each access device in the first device set, the processing unit may automatically recommend the cloud platform to each access device in the first device set, and the display unit displays the recommendation result in the first interface. For any access device in the first device set, namely, for the first access device, because the path requirement evaluation information of the path from the first access device to the first cloud platform meets the path requirement information, when the display unit displays the recommendation result in the first interface, the cloud platform that corresponds to the first access device and that is indicated by the recommendation result may be directly selected for the first access device, to enable the first access device to access the cloud platform that corresponds to the first access device and that is indicated by the recommendation result. In this way, platform selection efficiency is improved and labor costs are reduced.

Figure 9:
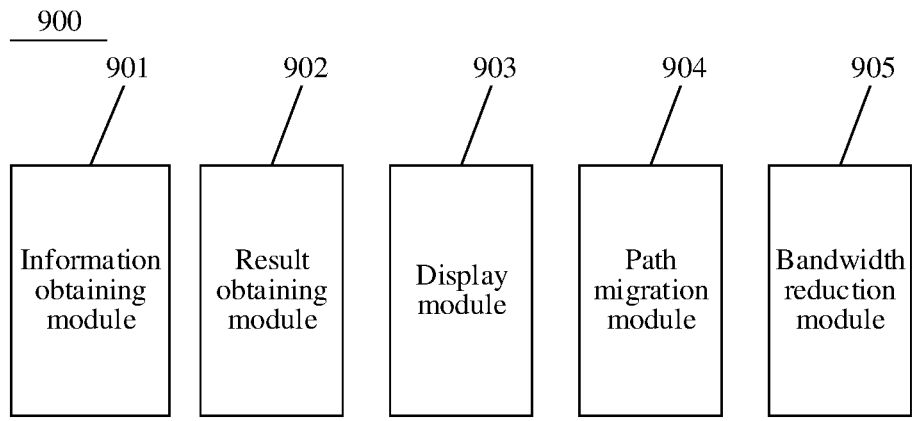
FIG. 9 is a schematic diagram of a structure of a cloud platform selection system according to an embodiment of this application.

As shown in FIG. 9, an embodiment of this application provides a cloud platform selection system 900. The system 900 includes:

an information obtaining module 901, configured to obtain service information, where the service information includes access device information and path requirement information, the access device information includes device identifiers of M access devices, the path requirement information includes bandwidth information, and M is an integer greater than 0;

a result obtaining module 902, configured to obtain a recommendation result of a cloud platform based on the service information, where the recommendation result indicates a cloud platform corresponding to each access device in a first device set, the first device set includes a first access device, the first access device corresponds to a first cloud platform, path requirement evaluation information of a path from the first access device to the first cloud platform meets the path requirement information, the first device set includes the M access devices or a part of the M access devices, the cloud platform corresponding to each access device belongs to a candidate cloud platform set, the candidate cloud platform set includes P cloud platforms, and P is an integer greater than 0; and a display module 903, configured to display the recommendation result in a first interface.

Optionally, the information obtaining module 901, the result obtaining module 902, and the display module 903 are deployed on different devices, or are deployed on a same device.

Optionally, for a detailed implementation process in which the information obtaining module 901 obtains the service information, refer to related content in step 401 in the method 400 shown in FIG. 4.

Optionally, for a detailed implementation process in which the result obtaining module 902 obtains the recommendation result of the cloud platform, refer to related content in steps 402 to 403 in the method 400 shown in FIG. 4.

Optionally, for a detailed implementation process in which the display module 903 displays the recommendation result in the first interface, refer to related content in step 404 in the method 400 shown in FIG. 4.

Optionally, the display module 903 is further configured to:

display a network topology in the first interface, where nodes in the network topology include the M access devices and the P cloud platforms, the network topology includes at least one latency circle corresponding to a root node, the root node is a node in the network topology, the at least one latency circle is in a one-to-one correspondence with at least one latency threshold, and includes a first latency circle, a minimum latency from nodes located in the first latency circle to the root node is less than or equal to a first latency threshold, a minimum latency from nodes located outside the first latency circle to the root node is greater than the first latency threshold, and the first latency threshold is a latency threshold corresponding to the first latency circle.

Optionally, for a detailed implementation process in which the display module 903 displays the network topology, refer to related content in step 404 in the method 400 shown in FIG. 4.

Optionally, the display module 903 is further configured to:
display, in the network topology, the path from the first access device to the first cloud platform in a specified display manner.

Optionally, the specified display manner includes highlighting, displaying in bold, and/or displaying the path by using a color corresponding to the path.

Optionally, the result obtaining module 902 is configured to:
calculate N paths based on the service information, where N is greater than 0 and less than or equal to M, each path corresponds to a different access device, the N paths include a first path, path requirement evaluation information of the first path meets the path requirement information, the first path is a path from an access device in the first device set to a virtual node, and the virtual node is a parent node of the P cloud platforms; and
select, based on the N paths, the cloud platform corresponding to each access device in the first device set, to obtain the recommendation result.

Optionally, for a detailed implementation process in which the result obtaining module 902 calculates the N paths, refer to related content in step 402 in the method 400 shown in FIG. 4.

Optionally, for a detailed implementation process in which the result obtaining module 902 selects the cloud platform corresponding to each access device in the first device set, refer to related content in step 403 in the method 400 shown in FIG. 4.

Optionally, the first path corresponds to the first access device, and the result obtaining module 902 is configured to:
calculate the first path based on a device identifier of the first access device, the path requirement information, and the network topology of the network, where the nodes in the network topology include the virtual node, the M access devices, and the P cloud platforms.

Optionally, for a detailed implementation process in which the result obtaining module 902 calculates the first path, refer to related content in step 402 in the method 400 shown in FIG. 4.

Optionally, the network topology further includes link information of a link between two adjacent nodes in the network topology, and the link information includes an available bandwidth of the link.

Optionally, the link information further includes a latency and/or a route weight of the link, and the route weight indicates a route cost of the link.

Optionally, the first path is a shortest path from the first access device to the virtual node.

Optionally, the result obtaining module 902 is configured to:
obtain an overloaded link set is obtained based on the path requirement information and the N paths, where the overloaded link set includes at least one overloaded link and all or a part of links that the N paths pass through, and a load of the overloaded link exceeds an available bandwidth of the overloaded link;
obtain a first path set based on the overloaded link set, where the first path set includes a part or all of the N paths, and a load of a link that a path in the first path set passes through does not exceed an available bandwidth of the link; and
select a cloud platform that a second path passes through as a cloud platform corresponding to a second access device, where the second path is a path included in the first path set, and the second access device is an access device corresponding to the second path.

Optionally, for a detailed implementation process in which the result obtaining module 902 obtains the overloaded link set, refer to related content in step 4031 in the method 400 shown in FIG. 4.

Optionally, for a detailed implementation process in which the result obtaining module 902 obtains the first path set, refer to related content in steps 4032 to 4035 in the method 400 shown in FIG. 4.

Optionally, the result obtaining module 902 is configured to:
obtain loads of a plurality of links based on the path requirement information and the N paths, where the plurality of links include the links that the N paths pass through and a first link, a load of the first link is equal to a sum of path bandwidths required by access devices corresponding to at least one path, and the at least one path passes through the first link; and
obtain the overloaded link set based on the loads of the plurality of links.

Optionally, for a detailed implementation process in which the result obtaining module 902 obtains the loads of the plurality of links, refer to content of the operation (1) in step 4031 in the method 400 shown in FIG. 4.

Optionally, for a detailed implementation process in which the result obtaining module 902 obtains the overloaded link set based on the loads of the plurality of links, refer to content of the operation (2) in step 4031 in the method 400 shown in FIG. 4.

Optionally, the result obtaining module 902 is configured to:
obtain a second path set based on the overloaded link set, where each path in the second path set passes through one or more overloaded links in the overloaded link set;
select a third path that meets a specified condition from the second path set;
reduce a load of a target link based on a path bandwidth required by an access device corresponding to the third path, where the target link is an overloaded link that the third path passes through; and
migrate a fourth path from the second path set to the first path set, where a load of each overloaded link that the fourth path passes through does not exceed an available bandwidth of the overloaded link.

Optionally, for a detailed implementation process in which the result obtaining module 902 obtains the second path set, refer to related content in step 4032 in the method 400 shown in FIG. 4.

Optionally, for a detailed implementation process in which the result obtaining module 902 selects the third path, refer to related content in step 4033 in the method 400 shown in FIG. 4.

Optionally, for a detailed implementation process in which the result obtaining module 902 reduces the load of the target link, refer to related content in step 4034 in the method 400 shown in FIG. 4.

Optionally, the specified condition that the third path meets includes one or more of the following:

an overload degree of the third path is the largest, a quantity of links included by the third path is the largest, and the path bandwidth required by the access device corresponding to the third path is the smallest, where the overload degree of the third path indicates a quantity of overloaded links that the third path passes through.

Optionally, the system 900 further includes:

a path migration module 904, configured to migrate the third path from the second path set to a third path set.

Optionally, the first path set further includes a path that is in the N paths and that does not belong to the second path set.

Optionally, the system 900 further includes:

a bandwidth reduction module 905, configured to reduce, based on a path bandwidth required by the second access device, an available bandwidth of a link that the second path passes through.

Optionally, for a detailed implementation process in which the bandwidth reduction module 905 reduces the available bandwidth of the link that the second path passes through, refer to related content in step 4036 in the method 400 shown in FIG. 4.

Optionally, the result obtaining module 902 is further configured to:

calculate Y paths based on device identifiers of X access devices and the path requirement information, where the X access devices include an access device corresponding to each path in the third path set, X is an integer greater than 0, and Y is greater than 0 and less than or equal to X; and select, based on the Y paths, a corresponding cloud platform for an access device in a second device set, where the second device set includes an access device corresponding to each of the Y paths.

Optionally, for a detailed implementation process in which the result obtaining module 902 calculates the Y paths, refer to related content in step 501 in the method 400 shown in FIG. 4.

Optionally, for a detailed implementation process in which the result obtaining module 902 selects the corresponding cloud platform for the access device in the second device set, refer to related content in step 502 in the method 400 shown in FIG. 4.

In embodiments of this application, because the result obtaining module obtains the recommendation result of the cloud platform based on the service information, and the recommendation result indicates the cloud platform corresponding to each access device in the first device set, the result obtaining module may automatically recommend the cloud platform to each access device in the first device set, and the display module displays the recommendation result in the first interface. For any access device in the first device set, namely, for the first access device, because the path requirement evaluation information of the path from the first access device to the first cloud platform meets the path requirement information, when the display module displays the recommendation result in the first interface, the cloud platform that corresponds to the first access device and that is indicated by the recommendation result may be directly selected for the first access device, to enable the first access device to access the cloud platform that corresponds to the first access device and that is indicated by the recommendation result. In this way, platform selection efficiency is improved and labor costs are reduced.

Figure 10:
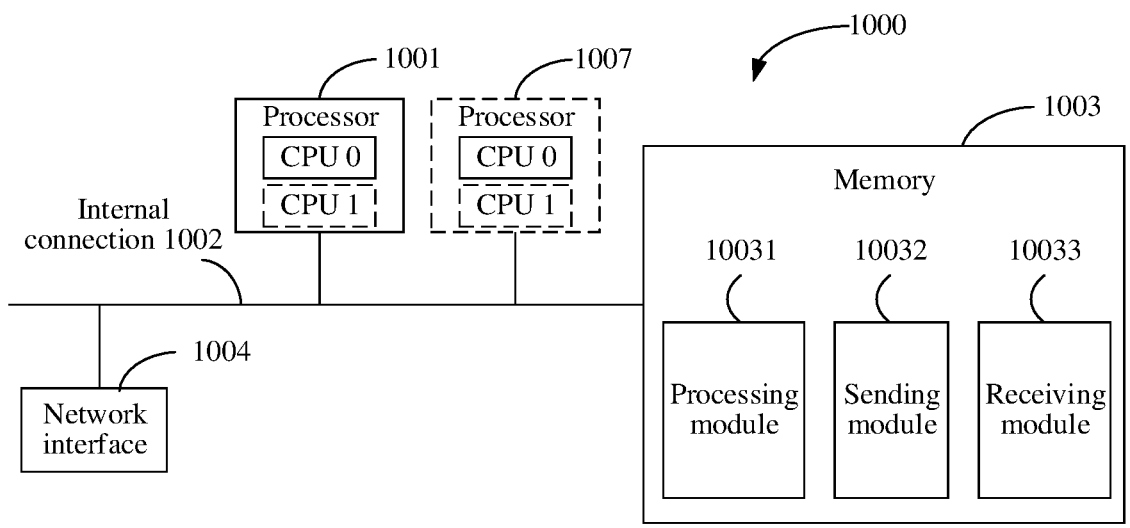
FIG. 10 is a schematic diagram of a structure of a cloud platform selection device according to an embodiment of this application.

FIG. 10 is a schematic diagram of an example cloud platform selection device 1000 according to an embodiment of this application. The device 1000 may be the network management device provided in any one of the foregoing embodiments, for example, may be the network management device 4 in the network architecture 100 shown in FIG. 1 or the network management device in the method 400 shown in FIG. 4. The device 1000 includes at least one processor 1001, an internal connection 1002, a memory 1003, and at least one network interface 1004.

The device 1000 is an apparatus of a hardware structure.

In some embodiments, the device 1000 may be configured to implement the functional modules in the apparatus 800 in FIG. 8. For example, a person skilled in the art may figure out that the processing unit 801 and the display unit 802 in the apparatus 800 shown in FIG. 8 may be implemented by the at least one processor 1001 by invoking code in the memory 1003.

Alternatively, in some embodiments, the memory 1003 is configured to store program modules and data. The program modules include a processing module 10031, a sending module 10032, and a receiving module 10033. In some embodiments, the modules in the memory 1003 in FIG. 10 correspond to the modules shown in FIG. 8. The processor 1001 can execute computer-readable instructions in the modules in the memory 1003 to perform operations that can be performed by the modules shown in FIG. 8.

The device 1000 may further be configured to implement a function of the network management device in any one of the foregoing embodiments.

The processor 1001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 1001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of this application. Alternatively, the processor may be a combination of processors implementing a computing function, for example, a combination of one or more microprocessors, or a combination of a DSP and a microprocessor.

The internal connection 1002 may include a path for transmitting information between the foregoing components. The internal connection 1002 may be a board, a bus, or the like. The bus may be a peripheral component interconnect standard (PCI) bus, an extended industry standard architecture (EISA) bus, or the like. The bus can be divided into an address bus, a data bus, a control bus, and the like. For ease of indication, the bus is represented by using only one bold line in FIG. 10. However, it does not indicate that there is only one bus or only one type of bus.

The at least one network interface 1004 is any apparatus such as a transceiver, and is configured to communicate with another device or a communication network. The communication network may be the Ethernet, a radio access network, a wireless local area network (WLAN), or the like. The network interface 1004 may include a wired communication interface, and may further include a wireless communication interface. Specifically, the network interface 1004 may be an Ethernet interface, a fast Ethernet (FE) interface, a gigabit Ethernet (GE) interface, an asynchronous transfer mode (ATM) interface, a wireless local area network WLAN interface, a cellular network communication interface, or a combination thereof. The Ethernet interface may be an optical interface, an electrical interface, or a combination thereof. In embodiments of this application, the network interface 1004 may be used by the device 1000 to communicate with another device.

The memory 1003 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer, but is not limited thereto. The memory may exist independently, and is connected to the processor through the bus. The memory 1003 may further be integrated with the processor 1001.

In specific implementation, in an embodiment, the processor 1001 may include one or more CPUs, for example, the CPU 0 and the CPU 1 shown in FIG. 10. Each of the CPUs may be a single-core processor, or may be a multi-core processor. The processor herein may refer to one or more devices, circuits, and/or processing cores configured to process data (for example, computer program instructions).

In specific implementation, in an embodiment, the device 1000 may include a plurality of processors, for example, the processor 1001 and a processor 1007 in FIG. 10. Each of the processors may be a single-core (single-CPU) processor, or may be a multi-core (multi-CPU) processor. The processor herein may refer to one or more devices, circuits, and/or processing cores configured to process data (for example, computer program instructions).

In specific implementation, in an embodiment, the device 1000 may further include an output device and an input device. The output device communicates with the processor 1001, and may display information in a plurality of manners. For example, the output device may be a liquid crystal display (LCD), a light emitting diode (LED) display device, a cathode ray tube (CRT) display device, or a projector. The input device communicates with the processor 1001, and may receive an input of a user in a plurality of manners. For example, the input device may be a mouse, a keyboard, a touchscreen device, or a sensing device.

In a specific embodiment, the device 1000 in this embodiment of this application may correspond to the foregoing plurality of embodiments, for example, the network management device in the plurality of embodiments corresponding to FIG. 1 and FIG. 4. The processor 1001 in the device 1000 reads the instructions in the memory 1003, to enable the device 1000 shown in FIG. 10 to perform all or a part of operations of the network management device in the foregoing plurality of embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are only non-limiting example embodiments and are not intended to limit the protection scope, which is intended to cover any modification, equivalent replacement, or improvement made within the principle of this application.

What is claimed is:

1. A cloud platform selection method, comprising:
   obtaining service information, wherein the service information comprises access device information and path requirement information, the access device information comprises device identifiers of M access devices, the path requirement information comprises bandwidth information, and M is an integer greater than 0;
   obtaining a recommendation result of a cloud platform based on the service information, wherein the recommendation result indicates a cloud platform corresponding to each access device in a first device set, the first device set comprises a first access device, the first access device corresponds to a first cloud platform, path requirement evaluation information of a path from the first access device to the first cloud platform meets the path requirement information, the first device set comprises at least a part of the M access devices, the cloud platform corresponding to each access device belongs to a candidate cloud platform set, the candidate cloud platform set comprises P cloud platforms, and P is an integer greater than 0; and
   displaying the recommendation result in a first interface, wherein the obtaining a recommendation result of a cloud platform based on the service information comprises:
   calculating N paths based on the service information, wherein N is greater than 0 and less than or equal to M, each of the N paths corresponds to a different access device, the N paths comprise a first path, path requirement evaluation information of the first path meets the path requirement information, the first path is a path from an access device in the first device set to a virtual node, and the virtual node is a parent node of the P cloud platforms; and
   selecting, based on the N paths, the cloud platform corresponding to each access device in the first device set, to obtain the recommendation result.

2. The method according to claim 1, further comprising:
   displaying a network topology in the first interface, wherein nodes in the network topology comprise the M access devices and the P cloud platforms, the network topology comprises at least one latency circle corresponding to a root node in the network topology, the at least one latency circle is in a one-to-one correspondence with at least one latency threshold and comprises a first latency circle, a minimum latency from nodes located in the first latency circle to the root node is less than or equal to a first latency threshold, a minimum latency from nodes located outside the first latency circle to the root node is greater than the first latency threshold corresponding to the first latency circle.

3. The method according to claim 1, wherein the method further comprises displaying a network topology in the first interface; and wherein the first path corresponds to the first access device, and the calculating of the N paths based on the service information comprises:

calculating the first path based on a device identifier of the first access device, the path requirement information, and the network topology, wherein the nodes in the network topology comprise the virtual node, the M access devices, and the P cloud platforms.

4. The method according to claim 3, wherein the first path is a shortest path from the first access device to the virtual node.

5. The method according to claim 4, wherein the network topology further comprises link information of a link between two adjacent nodes in the network topology, and the link information comprises an available bandwidth of the link.

6. The method according to claim 5, wherein the link information further comprises a latency and/or a route weight of the link, and the route weight indicates a route cost of the link.

7. The method according to claim 1, wherein the selecting, based on the N paths, the cloud platform corresponding to each access device in the first device set comprises:

obtaining an overloaded link set based on the path requirement information and the N paths, wherein the overloaded link set comprises at least one overloaded link and at least a part of links that the N paths pass through, and a load of the overloaded link exceeds an available bandwidth of the overloaded link;

obtaining a first path set based on the overloaded link set, wherein the first path set comprises at least a part of the N paths, and a load of a link that a path in the first path set passes through does not exceed an available bandwidth of the link; and selecting a cloud platform that a second path passes through as a cloud platform corresponding to a second access device corresponding it the second path, wherein the second path is a path comprised in the first path set.

8. The method according to claim 7, wherein the obtaining an overloaded link set based on the path requirement information and the N paths comprises:

obtaining loads of a plurality of links based on the path requirement information and the N paths, wherein the plurality of links comprise the links that the N paths pass through and a first link, a load of the first link is equal to a sum of path bandwidths required by access devices corresponding to at least one path passing through the first link; and obtaining the overloaded link set based on the loads of the plurality of links.

9. The method according to claim 7, wherein the obtaining a first path set based on the overloaded link set comprises:

obtaining a second path set based on the overloaded link set, wherein each path in the second path set passes through one or more overloaded links in the overloaded link set;

selecting a third path that meets a specified condition from the second path set;

reducing a load of a target link based on a path bandwidth required by an access device corresponding to the third path, wherein the target link is an overloaded link that the third path passes through; and migrating a fourth path from the second path set to the first path set, wherein a load of each overloaded link that the fourth path passes through does not exceed an available bandwidth of the overloaded link.

10. The method according to claim 9, wherein the specified condition that the third path meets comprises:

an overload degree of the third path is the largest, a quantity of links comprised by the third path is the largest, and/or the path bandwidth required by the access device corresponding to the third path is the smallest, wherein the overload degree of the third path indicates a quantity of overloaded links that the third path passes through.

11. The method according to claim 9, further comprising:

migrating the third path from the second path set to a third path set.

12. The method according to claim 9, wherein the first path set further comprises a path that is in the N paths and does not belong to the second path set.

13. The method according to claim 7, wherein after the selecting a cloud platform that a second path passes through as a cloud platform corresponding to a second access device, the method further comprises:

reducing, based on a path bandwidth required by the second access device, an available bandwidth of a link that the second path passes through.

14. A cloud platform selection apparatus, comprising:

a memory storing instructions; and a processor coupled to the memory and configured to execute the instructions to cause the apparatus to:

obtain service information including access device information and path requirement information, wherein the access device information comprises device identifiers of M access devices, the path requirement information comprises bandwidth information, and M is an integer greater than 0, obtain a recommendation result of a cloud platform based on the service information, wherein the recommendation result indicates a cloud platform corresponding to each access device in a first device set, the first device set comprises a first access device corresponding to a first cloud platform, path requirement evaluation information of a path from the first access device to the first cloud platform meets the path requirement information, the first device set comprises at least a part of the M access devices, the cloud platform corresponding to each access device belongs to a candidate cloud platform set including P cloud platforms, and P is an integer greater than 0; and display the recommendation result in a first interface, wherein the processor is further configured to execute the instructions to cause the apparatus to:

calculate N paths based on the service information, wherein N is greater than 0 and less than or equal to M, each of the N paths corresponds to a different access device, the N paths comprise a first path, path requirement evaluation information of the first path meets the path requirement information, the first path is a path from an access device in the first device set to a virtual node, and the virtual node is a parent node of the P cloud platforms; and select based on the N paths, the cloud platform corresponding to each access device in the first device set, to obtain the recommendation result.

15. The apparatus according to claim 14, wherein the processor is further configured to execute the instructions to cause the apparatus to:

display a network topology in the first interface, wherein nodes in the network topology comprise the M access devices and the P cloud platforms, the network topology comprises at least one latency circle corresponding to a root node in the network topology, the at least one latency circle is in a one-to-one correspondence with at least one latency threshold and comprises a first latency circle, a minimum latency from nodes located in the first latency circle to the root node is less than or equal to a first latency threshold, a minimum latency from nodes located outside the first latency circle to the root node is greater than the first latency threshold corresponding to the first latency circle.

16. The apparatus according to claim 14, wherein the first path corresponds to the first access device, and the processor is further configured to execute the instructions to cause the apparatus to:
  display a network topology in the first interface; and
  calculate the first path based on a device identifier of the first access device, the path requirement information, and the network topology, wherein the nodes in the network topology comprise the virtual node, the M access devices, and the P cloud platforms.

17. The apparatus according to claim 14, wherein the processor is further configured to execute the instructions to cause the apparatus to:
  obtain an overloaded link set based on the path requirement information and the N paths, wherein the overloaded link set comprises at least one overloaded link and at least a part of links that the N paths pass through, and a load of the overloaded link exceeds an available bandwidth of the overloaded link;
  obtain a first path set based on the overloaded link set, wherein the first path set comprises at least a part the N paths, and a load of a link that a path in the first path set passes through does not exceed an available bandwidth of the link; and
  select a cloud platform that a second path passes through as a cloud platform corresponding to a second access device corresponding to the second path, wherein the second path is a path comprised in the first path set.

18. The apparatus according to claim 17, wherein the processor is further configured to execute the instructions to cause the apparatus to:
  obtain loads of a plurality of links based on the path requirement information and the N paths, wherein the plurality of links comprise the links that the N paths pass through and a first link, a load of the first link is equal to a sum of path bandwidths required by access devices corresponding to at least one path through the first link; and
  obtain the overloaded link set based on the loads of the plurality of links.

* * * * *